(12) United States Patent
Kaneko et al.

(10) Patent No.: US 9,057,008 B2
(45) Date of Patent: Jun. 16, 2015

(54) POROUS SILICA MATERIAL AND OPTICAL MICROPHONE

(71) Applicant: Panasonic Corporation, Osaka (JP)

(72) Inventors: Yuriko Kaneko, Nara (JP); Takuya Iwamoto, Osaka (JP); Ushio Sangawa, Nara (JP); Masahiko Hashimoto, Osaka (JP); Norihisa Mino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 131 days.

(21) Appl. No.: 13/919,061

(22) Filed: Jun. 17, 2013

(65) Prior Publication Data

US 2014/0056590 A1    Feb. 27, 2014

Related U.S. Application Data

(63) Continuation of application No. PCT/JP2012/005324, filed on Aug. 24, 2012.

(51) Int. Cl.
 *C09K 3/00* (2006.01)
 *H04R 23/00* (2006.01)
 *C01B 33/159* (2006.01)
 *B82Y 30/00* (2011.01)

(52) U.S. Cl.
 CPC ............... *C09K 3/00* (2013.01); *Y10T 428/268* (2015.01); *H04R 23/008* (2013.01); *C01B 33/159* (2013.01); *C01P 2004/50* (2013.01); *C01P 2004/64* (2013.01); *C01P 2006/10* (2013.01); *C01P 2006/82* (2013.01); *B82Y 30/00* (2013.01)

(58) Field of Classification Search
 CPC ........ C09K 3/00; B82Y 30/00; C01B 33/159; H04R 23/008; C01P 2006/82; C01P 2006/10; C01P 2004/50; C01P 2004/54
 USPC .................... 398/133; 428/338; 423/335, 338
 See application file for complete search history.

(56) References Cited

U.S. PATENT DOCUMENTS

| | | | | |
|---|---|---|---|---|
| 3,977,993 | A | * | 8/1976 | Lynch ............................ 423/338 |
| 4,132,806 | A | * | 1/1979 | Wason ........................... 514/770 |
| 4,150,101 | A | * | 4/1979 | Schmidt et al. ............... 423/338 |
| 4,202,813 | A | * | 5/1980 | Wason ........................... 524/493 |

(Continued)

FOREIGN PATENT DOCUMENTS

| | | |
|---|---|---|
| JP | 05-279011 A | 10/1993 |
| JP | 09-071410 A | 3/1997 |

(Continued)

OTHER PUBLICATIONS

Einarsrud et al., "Strenghtening of silica gels and aerogels by washing and aging processes," Journal of Non-Crystalline Solids 285 (2001) 1-7.*

(Continued)

*Primary Examiner* — Anthony J Zimmer
(74) *Attorney, Agent, or Firm* — Renner, Otto, Boisselle & Sklar, LLP

(57) ABSTRACT

A porous silica material disclosed in the present application is a porous silica material in which a plurality of silica particles are connected to one another three-dimensionally, wherein: a density of the porous silica material is less than 220 kg/m$^3$; a particle diameter of the silica particles is 3.5 nm or more; and the water content of the porous silica material is 8 wt % or less.

9 Claims, 15 Drawing Sheets

(56) References Cited

U.S. PATENT DOCUMENTS

| | | | | |
|---|---|---|---|---|
| 4,216,113 | A * | 8/1980 | Winyall | 523/210 |
| 4,256,682 | A * | 3/1981 | Denton | 502/232 |
| 4,260,454 | A * | 4/1981 | Wason et al. | 162/181.7 |
| 4,336,245 | A * | 6/1982 | Wason | 424/49 |
| 4,422,880 | A * | 12/1983 | Wason | 106/431 |
| 4,626,290 | A * | 12/1986 | Nakazawa et al. | 106/431 |
| 5,034,207 | A * | 7/1991 | Kerner et al. | 423/339 |
| 5,063,003 | A * | 11/1991 | Gonzalez-Oliver | 264/14 |
| 5,122,291 | A * | 6/1992 | Wolff et al. | 252/62 |
| 5,738,801 | A * | 4/1998 | Ziegler et al. | 252/62 |
| 5,939,051 | A * | 8/1999 | Santalucia et al. | 424/49 |
| 6,277,766 | B1 * | 8/2001 | Ayers | 438/778 |
| 6,344,240 | B1 * | 2/2002 | Menon et al. | 427/220 |
| 6,438,867 | B1 * | 8/2002 | Teich et al. | 34/470 |
| 6,440,397 | B2 * | 8/2002 | Thomas et al. | 424/49 |
| 6,516,537 | B1 * | 2/2003 | Teich et al. | 34/340 |
| 7,553,416 | B2 * | 6/2009 | Hua et al. | 210/500.1 |
| 2004/0124746 | A1 | 7/2004 | Suzuki et al. | |
| 2005/0194896 | A1 * | 9/2005 | Sugita et al. | 313/506 |
| 2008/0206122 | A1 * | 8/2008 | Keller | 423/335 |
| 2009/0001014 | A1 * | 1/2009 | Hua et al. | 210/510.1 |
| 2009/0004089 | A1 * | 1/2009 | Hua et al. | 423/338 |
| 2009/0123358 | A1 * | 5/2009 | Costa et al. | 423/338 |
| 2009/0247655 | A1 * | 10/2009 | Kim et al. | 521/64 |
| 2009/0317619 | A1 * | 12/2009 | Di Monte et al. | 428/315.7 |

FOREIGN PATENT DOCUMENTS

| | | |
|---|---|---|
| JP | 2004-131343 A | 4/2004 |
| JP | 2009-085868 A | 4/2009 |

OTHER PUBLICATIONS

Dorcheh and Abasi, "Silica aerogel; synthesis, properties, and characterization," Journal of Materials Processing Technology 199 (2008) 10-26.*

Rao et al., "Synthesis and physical properties of TEOS-based silica aerogels prepared by two step (acid-base) sol-gel process," Solid State Sciences 6 (2004) 945-952.*

International Search Report for corresponding International Application No. PCT/JP2012/005324 mailed Sep. 25, 2012.

PCT/ISA/237 for corresponding International Application No. PCT/JP2012/005324 dated Sep. 25, 2012.

Hidetomo Nagahara et al.; "Development of High-Sensitivity Ultrasonic Transducer in Air with Nanofoam Material", Japanese Journal of Applied Physics, Jun. 30, 2005, vol. 44, No. 6B, p. 4485-4489.

Sumio Sakka, "Application of sol-gel method", Agne Shofu Publishing Inc., Jul. 31, 1997 (p. 44-45).

* cited by examiner

SOUND PRESSURE
→

POROUS SILICA MATERIAL AND OPTICAL MICROPHONE

This is a continuation of International Application No. PCT/JP2012/005324, with an international filing date of Aug. 24, 2012, the contents of which are hereby incorporated by reference.

BACKGROUND

1. Technical Field

The present application relates to a porous silica material used as an acoustic propagation medium, and an optical microphone.

2. Description of the Related Art

An optical microphone is a device for detecting a sound wave using light. Specifically, by taking in a sound wave into a transparent acousto-optic medium, the sound wave is converted to a compression wave propagating through the acousto-optic medium, and the compression wave is detected as temporal variations in the optical length using a vibrometer optical system such as a laser Doppler vibrometer (LDV), thus detecting the sound wave. Therefore, in order to realize an optical microphone having desirable characteristics, it is very important to develop an acousto-optic medium for efficiently converting a sound wave to variations in optical properties.

As such an acousto-optic propagation medium, Japanese Laid-Open Patent Publication No. 2009-85868 (herein after, referred to as Patent Document No. 1) discloses a porous silica material formed by a silica and an optical microphone using the same. Now, the structure and the operation of the optical microphone disclosed in Patent Document No. 1 will be described, and the function and the importance of an acousto-optic propagation medium in an optical microphone will be described.

FIG. 25 is a schematic diagram showing a configuration of a conventional optical microphone disclosed in Patent Document No. 1. A conventional microphone 101 includes a reception section 120, a detection section 121, and a conversion section 110.

The reception section 120 takes in a sound wave propagating through the environment around the reception section 120, and converts the sound wave to variations in optical properties. For this, the reception section 120 includes a base 103 having a depressed portion 103a, and a transparent support plate 107 supported so as to cover the opening of the depressed portion 103a. An acousto-optic propagation medium portion 102 made of a porous silica material is arranged in the space formed by the depressed portion 103a of a base 103 and the transparent support plate 107. Also, the depressed portion 103a includes an acoustic waveguide 106, one surface of which is defined by a top surface 102a of the acousto-optic propagation medium portion 102. The base 103 includes an opening 104 for allowing the sound wave to enter the acoustic waveguide 106.

The detection section 121 detects, using light, the variations in the optical properties which have occurred in the reception section 120. The detection section 121 is a laser Doppler vibrometer (abbreviated as LDV), and includes a head 108 and a calculation section 109.

A sound wave having propagated through the air propagates from the opening 104 into the acoustic waveguide 106 along a sound wave propagation direction 105. As the sound wave propagates through the acoustic waveguide 106, the sound wave enters the porous silica material of the acousto-optic propagation medium portion 102 through the top surface 102a of the acousto-optic propagation medium portion 102, and propagates through the acousto-optic propagation medium portion 102.

A laser beam 100 output from the head 108 toward the acousto-optic propagation medium portion 102 passes through the transparent support plate 107 and the acousto-optic propagation medium portion 102 to be reflected at a bottom surface 103c of the depressed portion 103a of the base 103. The reflected laser beam 100 passes again through the acousto-optic propagation medium portion 102 and exits from the acousto-optic propagation medium portion 102 to be received by the head 108. When a laser beam 100 passes through the acousto-optic propagation medium portion 102, the density and the refractive index of the porous silica material of the acousto-optic propagation medium portion 102 vary due to the propagation of the sound wave therethrough, and the laser beam 100 is modulated by these variations.

The laser beam 100 received by the head 108 is converted to an electric signal and is then output to the calculation section 109. The calculation section 109 processes the electric signal to output, to a conversion section 110, a modulated component contained in the laser beam 100 as a detection signal. The conversion section 110 converts the detection signal to a sound pressure to output a received signal. The conversion in the conversion section 110 is as follows.

The volume V of the porous silica material of the acousto-optic propagation medium portion expands/shrinks due to the sound pressure of the sound wave propagating through the inside of the acousto-optic propagation medium portion 102, thereby causing a volume change $\Delta V$. Due to the volume change $\Delta V$, the refractive index n of the porous silica material 102 changes by $\Delta n$. These relationships are represented by Expression (1).

$$\frac{\Delta V}{V} = -\frac{\Delta n}{n-1} \quad (1)$$

Since the sound wave is propagating through the inside of the porous silica material as an acoustic plane wave, the volume change $\Delta V$ is limited to displacement in the sound wave traveling direction. Therefore, Expression (2) holds true.

$$\frac{\Delta V}{V} = -\frac{\Delta l}{l} = S \quad (2)$$

Herein, l is the length of the porous silica material in the sound wave propagation direction, $\Delta l$ is the displacement in the sound wave propagation direction of the porous silica material due to the sound wave propagation therethrough, and S denotes the distortion of the porous silica material in the sound wave propagation direction. The sound pressure inside the porous silica material can be represented by Expression (3) with the distortion S and the elastic constant E of the porous silica material.

$$P = -S \times E \quad (3)$$

The elastic constant E can be represented by Expression (4) using the density $\rho$ and the sound speed C of the porous silica material.

$$E = C^2 \times \rho \quad (4)$$

From Expressions (1) to (4), the sound pressure P of the inside of the porous silica material can be represented by Expression (5) using the density ρ, the sound speed C and the refractive index n of the porous silica material, and the displacement output ΔL, which is an electric signal output from the head 108, or the velocity output v, which is the output of the calculation section 109.

$$P = -C^2 \times \rho \times \frac{\Delta n}{n-1} \qquad (5)$$
$$= -C^2 \times \rho \times \frac{n}{n-1} \cdot \frac{\Delta L}{L}$$
$$= -C^2 \times \rho \times \frac{n}{n-1} \cdot \frac{1}{L} \int v \, dt$$

Therefore, using the velocity output v output from the calculation section 109, it is possible to measure the sound pressure P.

Non-Patent Document No. 1, Sumio Sakka, "Application of sol-gel method", Agne Shofu Publishing Inc., Jul. 31, 1997 (P44-45) discloses a silica aerogel as a material having a particularly small modulus of elasticity among porous silica materials that are suitable for such an application. Non-Patent Document No. 1 states that the silica aerogel has a very small density of 0.03 to 0.3 g/cm$^3$, and the silica aerogel is useful as an acousto-optic propagation medium for an optical microphone.

The structure of a porous silica material used in a conventional optical microphone, and a method for manufacturing the same will now be described. A low-density porous silica material, commonly referred to as "silica aerogel", has many pores and 90% by volume thereof consists of voids. The skeleton is formed by spherical silica particles of about some nm to some tens of nm connected together.

Commonly, a porous silica material is produced by allowing a sol liquid including an alkoxide of silicon to undergo hydrolysis and polymerization reaction, thereby producing a wet gel, and then replacing the solution in the wet gel with a gas. When the solution is replaced with a gas, i.e., dried, the gel structure will be destroyed if the tensile stress based on the surface tension of the solution remaining in the pores is greater than the strength of the gel. In order to prevent this, supercritical drying is often used in the step of drying the wet gel. Also, a porous silica material with very little aging can be obtained by subjecting the gel to a hydrophobization process. Non-Patent Document No. 1 discloses, as a hydrophobization process, a method for replacing a hydroxyl group remaining after hydrolysis and polycondensation with a hydrophobic modified group.

SUMMARY

In order to increase the sensitivity of the optical microphone, an acousto-optic medium is desired which more efficiently converts a sound wave to variations in the optical properties. A non-limiting example embodiment of the present application provides a porous silica material which increases the sensitivity of an optical microphone, and an optical microphone using the porous silica material.

A porous silica material disclosed in the present application is a porous silica material in which a plurality of silica particles are connected to one another three-dimensionally, wherein: a density of the porous silica material is less than 220 kg/m$^3$; a particle diameter of the silica particles is 3.5 nm or more; and a water content of the porous silica material is 8 wt % or less.

With the porous silica material disclosed in the present application, the density is less than 220 kg/m$^3$, the particle diameter of the silica particles is 3.5 nm or more, and the water content is 8 wt % or less. Thus, it is possible to realize a porous silica material having a low modulus of elasticity. By using the porous silica material, it is possible to realize an optical microphone having a high sensitivity.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

The present inventors have conducted a research on a porous silica material that is suitable as an acousto-optic propagation medium for an optical microphone in order to realize an optical microphone having a higher sensitivity.

Figure 26:
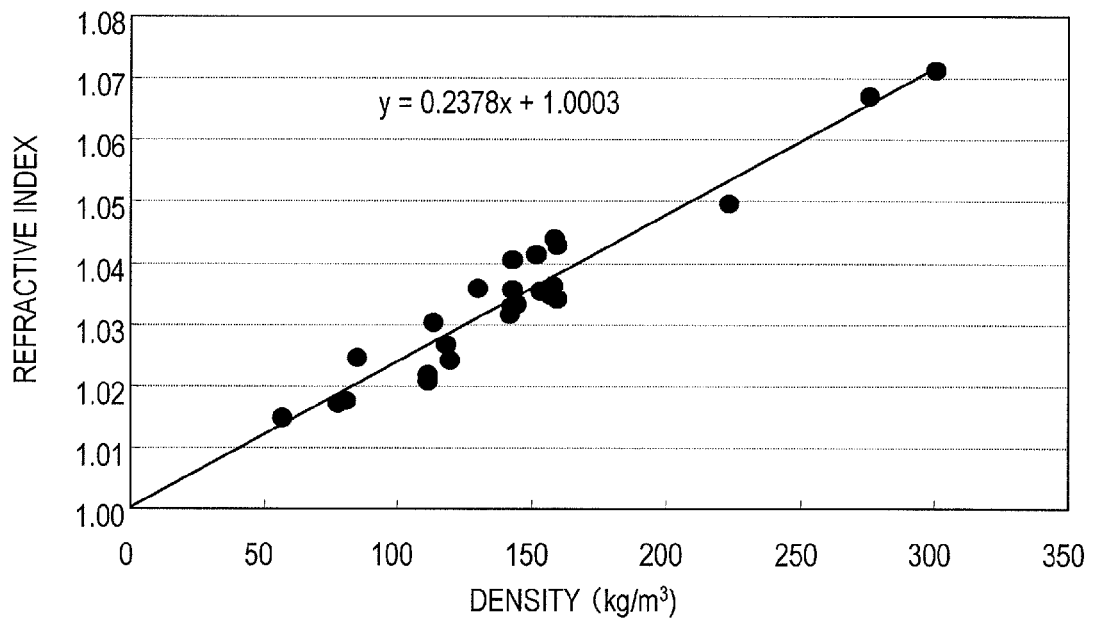
FIG. 26 is a graph showing a relationship between the refractive index n and the density ρ of a porous silica material obtained experimentally.

As can be seen from Expression (5) described above, where the sound pressure P is constant, the velocity v increases as ($C^2 \times \rho$) decreases. Therefore, in order to increase the velocity v and perform the measurement with a desirable sensitivity, thereby improving the sound pressure measurement sensitivity, $C^2 \times \rho$, i.e., the modulus of elasticity E of the porous silica material, can be decreased. Proportional multipliers of Expression (5) include, other than $C^2 \times \rho$, a term dependent on the refractive index n of the porous silica material. It has been found experimentally that there is a relationship shown in FIG. 26 between the refractive index n and the density ρ of a porous silica material. Therefore, the refractive index n can be approximated with a linear line of the density ρ whose intercept is the refractive index (1.0003) of the air. That is, the term of the refractive index n can be replaced with a term of the density. As can be seen from Expression (4), it is necessary to decrease the sound speed C and the density ρ of a porous silica material in order to decrease the modulus of elasticity E of the porous silica material.

Figure 27:
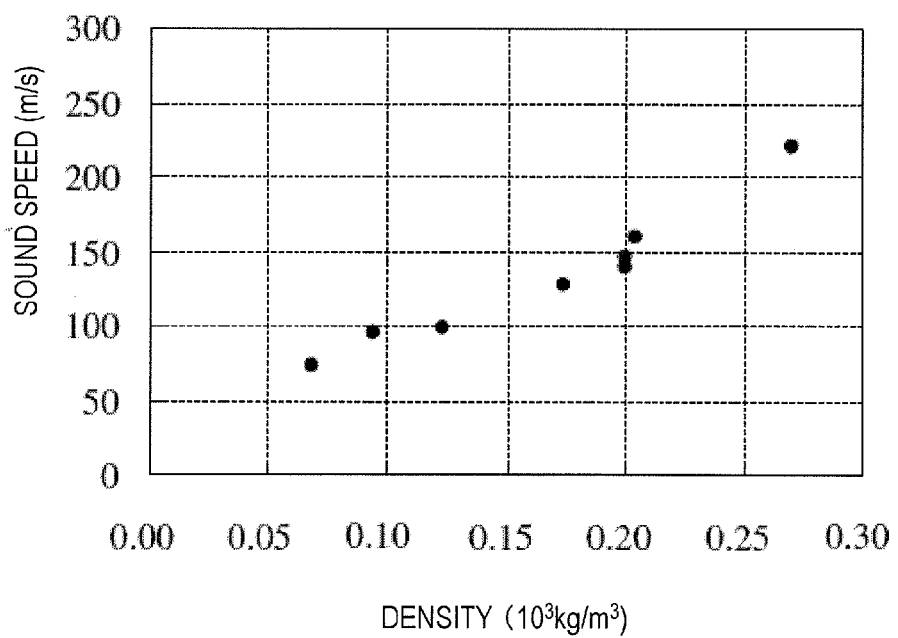
FIG. 27 is a graph showing a relationship between the density and the sound speed of porous silica material used in a conventional optical microphone.

The relationship between the sound speed C and the density ρ of a porous silica material is disclosed in, for example, Hidetomo Nagahara, Takashi Hashida, Masa-aki Suzuki, Masahiko Hashimoto, "Development of High-Sensitivity Ultrasonic Transducer in Air with Nanofoam Material," Japanese Journal of Applied Physics, Vol. 44, No. 6B, pp. 4485-4489, 2005. FIG. 27 shows a relationship between the density ρ and the acoustic signal propagation speed C of a porous silica material used in a conventional optical microphone. It is inferred from FIG. 27 that the sound speed C of the porous silica material is in proportion to the density ρ, and it is believed that the sound speed C will be further decreased by decreasing the density ρ of the porous silica material. Therefore, from Expression (4), it is believed that the modulus of elasticity E decreases in proportion to the density ρ cubed. Therefore, it is believed that in order to improve the sensitivity of an optical microphone, it is important to develop a low-density porous silica material.

However, as the present inventors researched and discussed in depth the structure and the physical properties of porous silica materials, it was found that there are cases where even if the density of a porous silica material is decreased, the modulus of elasticity thereof does not decrease in accordance with the tendency as inferred from FIG. 27.

Figure 1:
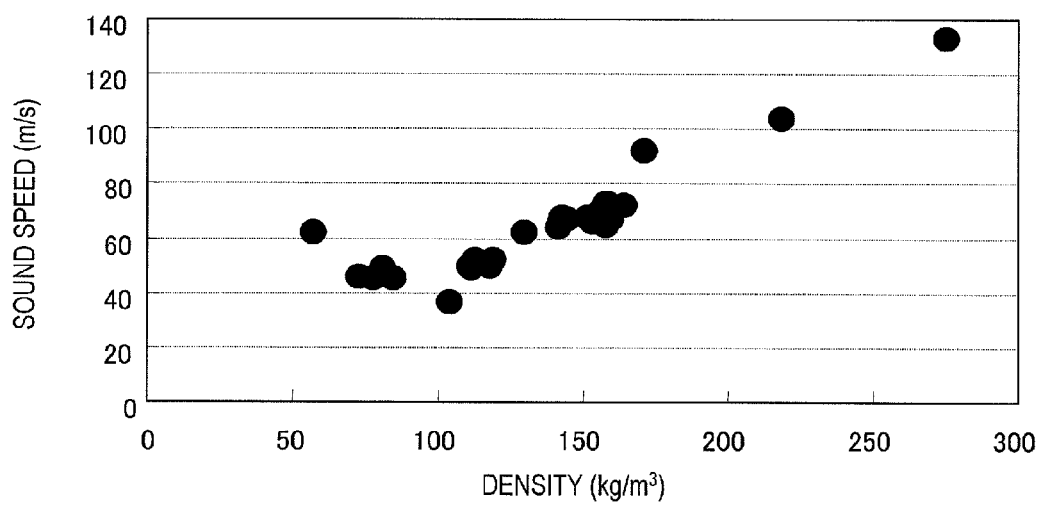
FIG. 1 is a graph showing a relationship between the density and the sound speed according to an embodiment of a porous silica material.
Figure 2:
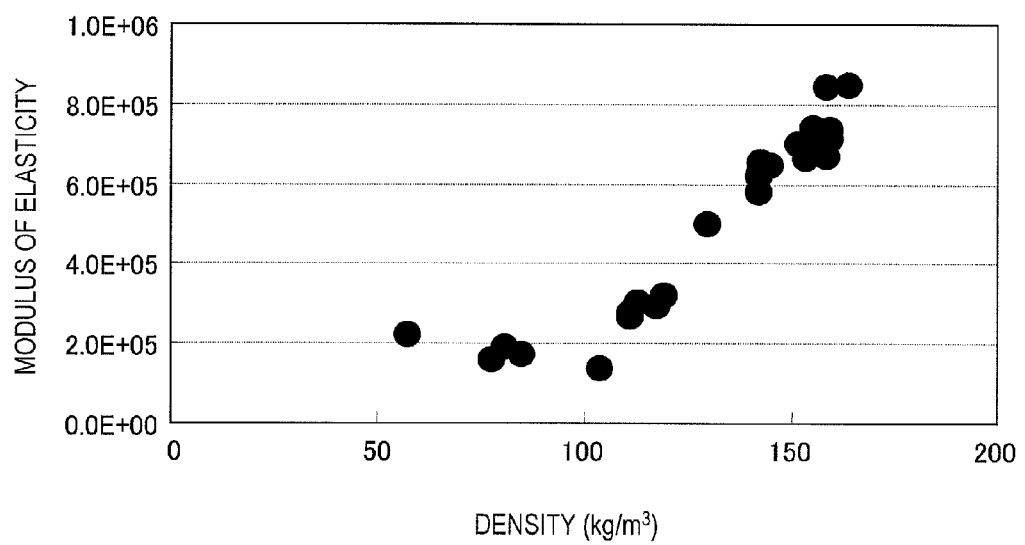
FIG. 2 is a graph showing a relationship between the density and the modulus of elasticity according to an embodiment of a porous silica material.

Specifically, porous silica materials of different densities were produced by varying the porous silica material synthesis conditions, and the physical properties thereof were examined. FIG. 1 shows a relationship between produced porous silica materials having various densities and the speed of the sound wave propagating through the porous silica materials. Hereinafter, the "sound speed of a porous silica material" represents the speed of a sound wave propagating through the porous silica material. In FIG. 1, the horizontal axis represents the density of the porous silica material, and the vertical axis represents the sound speed thereof. As can be seen from FIG. 1, the density and the sound speed are generally in proportion to each other over the density range from 300 kg/m³ to 100 kg/m³, whereas the sound speed tends to rather increase as the density decreases below 100 kg/m³. Such a tendency is different from the relationship between the density and the sound speed shown in FIG. 27. FIG. 2 is a graph obtained by calculating the modulus of elasticity using the measured sound speed and density, and plotting the density of the porous silica material on the horizontal axis, and the density on the vertical axis. Similar to the results shown in FIG. 1, it is shown that the modulus of elasticity does not decrease even if the density decreases below 100 kg/m³. Thus, it has been found that it is difficult to improve the sound wave measurement sensitivity using Expression (5) because the sound speed does not decrease in proportion to the density, and therefore the modulus of elasticity does not decrease.

It is known that the sound speed of a porous silica material is significantly smaller than the sound speed of the air (340 m/s at room temperature). However, the reason for this has not been identified. For example, Non-Patent Document No. 1 merely states that the sound speed property of an aerogel is a "strange property". Since a porous silica material is composed of the air and a silica skeleton (Si—O structure), one may infer that the sound speed of a porous silica material will take an average value between the sound speed of a silica skeleton and the sound speed of the air. However, the sound speed of a glass, which is a typical substance of a silica skeleton, is from 3000 m/s to 5000 m/s, and is greater than the sound speed of the air. Therefore, such inference is not correct. That is, the factor that determines the sound speed of a porous silica material is now known, and cannot be inferred based on known facts.

Note that a silica gel is known as a material having a similar composition as a porous silica material. A porous silica material and a silica gel are similar to each other in that the primary component is silica, but are totally different from each other in terms of the particle structure and the physical properties. A silica gel is used as an absorbent material, for example, and typically includes pores having a diameter of 10 nm or less and silica particles having a particle diameter of some hundreds of μm to some mm. The density of a silica gel is about 2200 kg/m³.

Since a silica gel has such a structure, a sound wave propagates through silica particles. Therefore, the sound speed of a silica gel is about the same as the sound speed of a glass described above. Since the sound speed and the density of a silica gel are greater than those of a porous silica material, the characteristic acoustic impedance represented by the product between the sound speed and the density is equal to a value ($1\times10^7$ Pas/m) that is about 1000 times that of the porous silica material. Thus, there is a large difference from the acoustic impedance ($4\times10^2$ Pas/m) of the air, and the sound wave entering from the air cannot enter the inside of the silica particles and is mostly reflected.

As a result of researching in depth the factor for determining the sound speed of a porous silica material, which has not been clear, the present inventors have found that the sound speed is greatly influenced by the water content of the porous silica material and the particle diameter of the silica particles of the porous silica material, thus arriving at the present invention. An outline of one embodiment of the present invention is as follows.

A porous silica material in one aspect of the present invention is a porous silica material in which a plurality of silica particles are connected to one another three-dimensionally, wherein: a density of the porous silica material is less than 220 kg/m³; a particle diameter of the silica particles is 3.5 nm or more; and a water content of the porous silica material is 8 wt % or less.

The particle diameter the plurality of silica particles is 3.5 nm or more and 20 nm or less.

The particle diameter of the plurality of silica particles is 8 nm or more and 20 nm or less.

A plurality of pores are provided between the plurality of silica particles, and the pores include a plurality of cavity portions and constriction portions located between the plurality of cavity portions; and an inner diameter of the constriction portion is smaller than an inner diameter of the cavity portion and is smaller than a mean free path of an air.

The plurality of silica particles do not form secondary particles but form a skeleton of the porous silica material.

The density is 57 kg/m³ or more and less than 220 kg/m³.

The water content is 0.79 wt % or more and 8 wt % or less.

An optical microphone in one aspect of the present invention includes: a reception section including acousto-optic propagation medium portion formed by the porous silica material according to any of the above, wherein a sound wave enters the reception section from a space around the reception section and propagates through the acousto-optic propagation medium portion; a detection section for outputting light of a wavelength that passes through the porous silica material, wherein the light passes through the acousto-optic propagation medium portion through which the sound wave is being propagated so as to detect the light which has been modulated by the sound wave, thereby outputting a detection signal; and a conversion section for converting the detection signal to a sound pressure to output a received signal.

The detection section is a laser Doppler vibrometer.

An embodiment of a porous silica material and an optical microphone of the present invention will now be described.

First Embodiment

Figure 3:
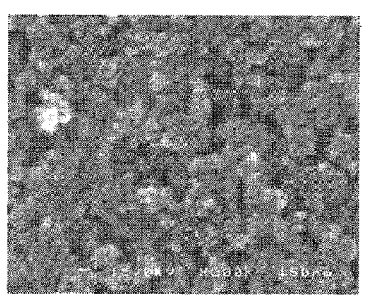
FIG. 3 is a view showing an SEM image of an embodiment of a porous silica material.
Figure 4:
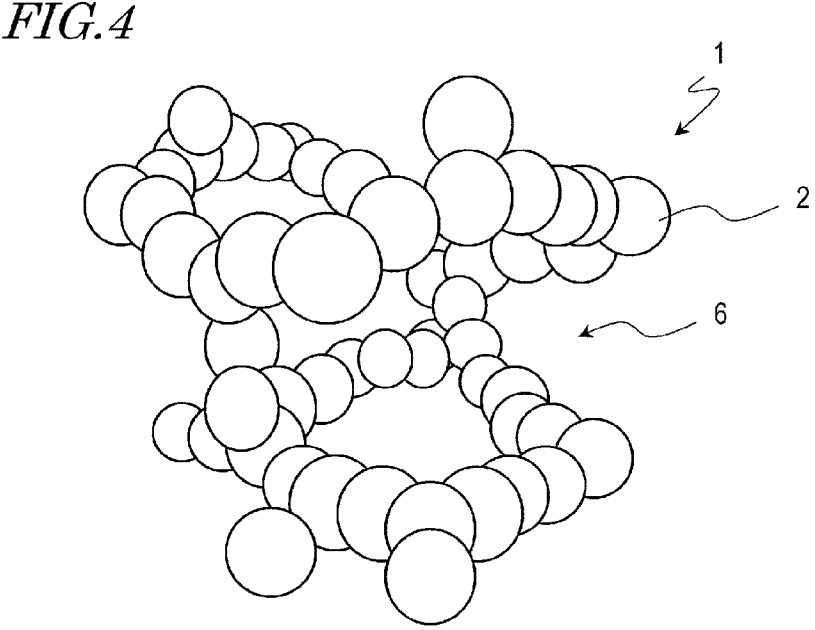
FIG. 4 is a schematic diagram showing a structure of an embodiment of a porous silica material.

One embodiment of a porous silica material of the present invention will be described. FIG. 3 is an SEM image showing an example of a porous silica material of the present embodiment. FIG. 4 is a schematic diagram showing a portion of a porous silica material on an enlarged scale. As shown in FIGS. 3 and 4, a porous silica material 1 according to the present invention has a structure in which a plurality of silica particles 2 are connected to one another three-dimensionally. Therefore, the porous silica material 1 can be regarded a three-dimensional isotropic elastic body, and a sound wave propagating therethrough has no directionality. Voids 6 are formed in the porous silica material 1. The voids 6 are continuous with one another, forming a plurality of pores. As the porous silica material 1 includes the voids 6, the density of the porous silica material 1 is smaller than those of common substances. Since the voids 6 are formed, the positions of the silica particles 2 are displaced by the sound pressure, and the displacement can propagate through the porous silica material 1.

The density of the porous silica material 1 may be less than 220 kg/m³. As will be described below in detail, when the density is 220 kg/m³ or more, the particle diameter of the silica particles 2 is small, and the porous silica material 1 is closely filled with silica particles, resulting in small voids between silica particles. Therefore, it is believed that the porous silica material is formed by a structure that is different from the unique structure described above through which a sound wave propagates and which exhibits a low sound speed, and it is no longer possible to obtain a porous silica material having a small modulus of elasticity.

With a porous silica material having an increased density close to the true density of silica, since a sound propagates through the silica particles, it will exhibit a sound speed (about 3000 m/s) determined by the physical properties of silica. With a material such that a sound propagates through silica particles, the sound speed, which is a physical property, is hardly influenced even if the water content changes. Note that the true density is defined as being a density such that only the volume occupied by the substance itself is used as the volume for calculating the density. The true density of silica is about 2200 kg/m³ as described above.

The density being less than 220 kg/m³ means that the voids 6 are large, and that the positions of the silica particles 2 can be displaced and the displacement can propagate through the porous silica material 1.

As described above, as an acousto-optic propagation medium portion, it is important for a porous silica material to have a small modulus of elasticity, and the modulus of elasticity is dependent on the sound speed and the density. With the porous silica material 1 of the present invention, the water content of the porous silica material 1 is limited to 8 wt % or less in order to decrease the sound speed. The particle diameter of the silica particles 2 may be large. Specifically, the particle diameter of the silica particles 2 may be 3.5 nm or more in order to realize a sound speed lower than that of the air, and the particle diameter of the silica particles 2 may be 8 nm or more in order to obtain a sound speed of 100 m/s or less. Where the porous silica material 1 is used as the acousto-optic propagation medium portion, the particle diameter of the silica particles 2 may be 20 nm or less in view of the optical transmittance.

The "density" as used in the present specification is the ratio between the mass of the porous silica material and the volume of the porous silica material. The volume of the porous silica material includes pores whether they are open pores or closed pores. The "particle diameter" is an average size measured by a transmission method using small angle X-ray scattering (horizontal sample stage type strong X-ray diffractometer, RINT-TTR III from Rigaku Corporation) and obtained by using analysis software, NANO-Solver. A model of the analysis software, NANO-Solver, was used while setting scatterer model to sphere, particle to SiO$_2$ and matrix to the air. The "water content" is the water content proportion (wt %) obtained by dividing the weight of water contained in the porous silica material by the weight of the porous silica material. The weight of water contained in the porous silica material was measured using a differential thermal analyzer, Thermo plus TG-DTA, TG-8120, from Rigaku Corporation. About 7 mg to 10 mg of a porous silica material was taken and coarsely powdered, which was set in TG-8120 in an aluminum cup. The weight of water was determined as a weight decrease experienced when increasing the temperature in the air from room temperature to 200° C. by 10° C. every minute using TG-8120.

Figure 5:
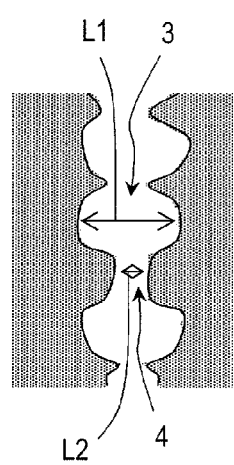
FIG. 5 is a schematic diagram showing a cross section of a pore in an embodiment of a porous silica material.

The structural characteristic and the physical properties of the porous silica material 1 will now be described in detail. FIG. 5 is a schematic cross-sectional view showing some of the pores of the porous silica material 1. A pore forming a void includes a plurality of cavity portions 3, and a constriction portion 4 located between a plurality of cavity portions 3. The constriction portions 4 are portions with relatively smaller inner diameters as compared with an average inner diameter of a pore, and the inner diameter L2 of the constriction portion 4 is smaller than the inner diameter L1 of the cavity portion 3 as shown in FIG. 5. The inner diameter L2 of the constriction portion 4 may be smaller than the mean free path of the air. Where the inner diameter L2 of the constriction portion 4 is smaller than the mean free path of the air, it is believed that a sound wave cannot propagate through the air filling the pores of the porous silica material 1. Therefore, it is believed that with the porous silica material 1 having such pores, the sound wave does not propagate through the air filling the pores but propagates through the skeleton formed by the silica particles.

The mean free path of the air depends on the pressure and the temperature. Herein, "the inner diameter L2 of the constriction portion 4 being smaller than the mean free path of the air" means that "the inner diameter L2 of the constriction portion 4 is smaller than the mean free path of the air" at the temperature and the pressure at which the porous silica material 1 is used. For example, where the porous silica material 1 is used under normal temperature and pressure, the mean free path of the air is about 68 nm. Therefore, the inner diameter L2 of the constriction portion 4 may be smaller than 68 nm. In practice, where an optical microphone using the porous silica material 1 of the present embodiment is used under a pressure of 50000 Pa or more and 120000 Pa or less and in a temperature range of −20° C. or more and 200° C. or less, the mean free path of the air is about 50 nm or more and 180 nm or less in these pressure and temperature ranges. Therefore, as long as the inner diameter L2 of the constriction portion 4 is 50 nm or less, it can be used in these temperature and pressure ranges.

The size of the pore, i.e., the inner diameters L1 and L2 described above, depends on the method for manufacturing the porous silica material 1 and the size of the silica particles 2. Where the porous silica material 1 is produced by a sol-gel method and the particle diameter of the silica particles 2 is 20 nm or less, L2 is 50 nm or less generally in the temperature range and the pressure range described above.

As described above, it is believed that the air filling the pores in the porous silica material 1 does not serve as a sound wave propagation medium, but a sound wave propagates through the skeleton of the porous silica material 1. However, the sound speed of a sound wave propagating through silica particles is about 3000 m/s or more, and this does not coincide with the fact that it is slower than the sound speed of the porous silica material 1. From this, it is believed that the propagation of a sound wave through the porous silica material 1 is not such that a sound wave propagates through the silica particles 2, but is such that the positions of the silica particles 2 are moved by the sound pressure and the displacement propagates between silica particles, thereby propagating the sound wave.

Figure 6:
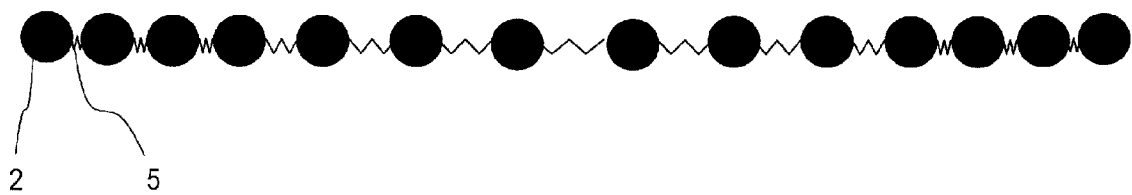
FIG. 6 is a diagram showing a silica particle binding model according to an embodiment of a porous silica material.

From these discussions, it is believed that a silica particle 2 is bound to an adjacent silica particle 2 with a bond 5 having a predetermined binding energy in the porous silica material 1 as shown in FIG. 6. As will be described below, it is believed that because the water content influences the sound speed of the porous silica material 1, the bond 5 is not dominantly the covalent bond (50 to 200 kcal/mol) or the ionic bonding but is dominantly the hydrogen bond (3 to 7 kcal/mol).

Since the distance between silica particles 2 is very small, as compared with the wavelength of a sound, the porous silica material 1 can be treated as a continuous body. For example, in the porous silica material 1 having a sound speed of 50 m/s, the waveform of a sound of 40 kHz is 1.25 mm, whereas the distance between silica particles is about 60 nm. Therefore, the porous silica material 1 can be approximated in mean-field approximation. That is, a silica particle 2 can be treated as a material point bound in potential. According to this model, the velocity v of the silica particles 2 is represented by Expression (6). In Expression (6), M is the weight of the silica particle 2, and k is a constant that determines the potential (binding energy) of the silica particle.

$$v \propto \sqrt{\frac{k}{M}} \tag{6}$$

The weight M of the silica particle 2 is in proportion to the volume thereof. The volume of the silica particle 2 can be expressed by the diameter r of the silica particle, and the relationship between the weight M of the silica particle 2 and the diameter r of the silica particle 2 is represented by Expression (7).

$$M \propto 4/3\pi r^3 \tag{7}$$

Figure 7:
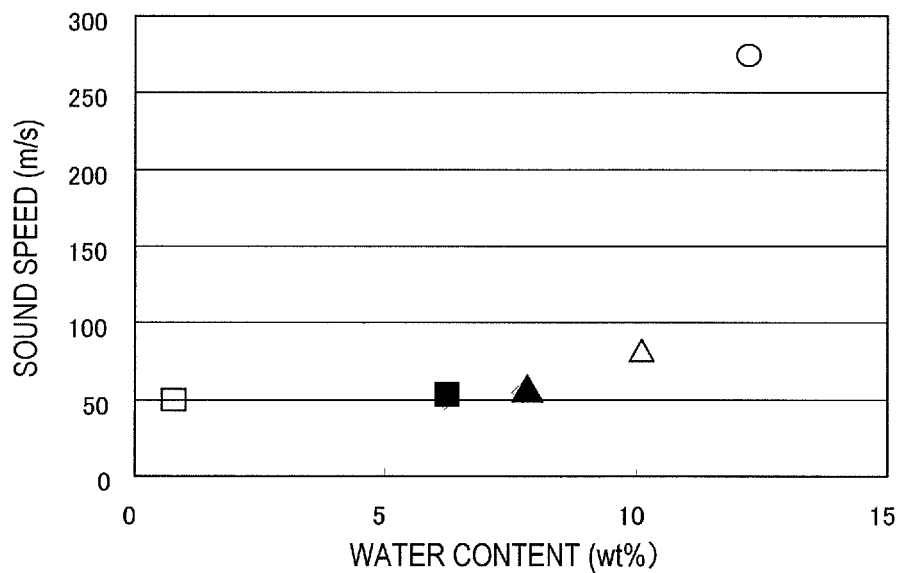
FIG. 7 is a graph showing a relationship between the water content and the sound speed according to an embodiment of a porous silica material.

The speed of the silica particle 2 can also be called the sound wave propagation speed through the porous silica material 1. That is, from Expressions (6) and (7), the verocity v through the porous silica material 1 can be represented by Expression (8).

$$v \propto \sqrt{\frac{k}{r^3}} \tag{8}$$

Where the binding energy k is constant, the velocity v is in proportion to the silica particle diameter r to the power of −1.5. One of the characteristics of the porous silica material 1 according to the present invention is that the water content of the porous silica material 1 is 8 wt % or less. FIG. 7 shows a relationship between the water content and the sound speed in a porous silica material formed by silica particles whose particle diameter is about 12 nm. As shown in FIG. 7, where the water content is 8 wt % or less, the sound speed is about 50 m/s. In contrast, if the water content is greater than 8 wt %, the sound speed becomes significantly higher.

Figure 8:
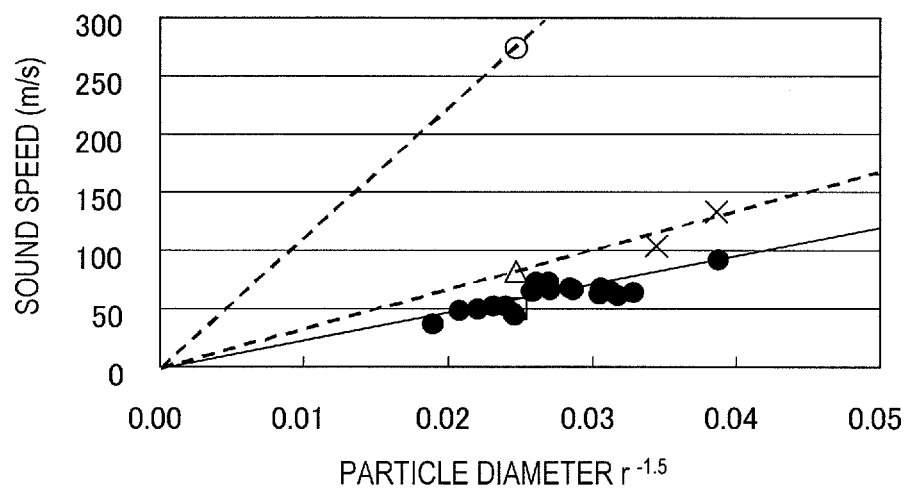
FIG. 8 is a graph showing a relationship between the particle diameter to the power of −1.5 and the sound speed according to an embodiment of a porous silica material.

FIG. 8 shows, by black circles, a relationship between the particle diameter r of the porous silica material to the power of −1.5 and the sound speed, wherein the porous silica material 1 has a density less than 220 kg/m³, is formed by silica particles of various particle diameters, and has been adjusted so that the water content thereof is 8 wt % or less. For the purpose of comparison, a white triangle and a white circle represent a relationship between the particle diameter r to the power of −1.5 and the sound speed of a porous silica material whose water content is 10 wt % and that of a porous silica material whose water content is 12 wt % (also shown in FIG. 7). Moreover, symbols "x" in FIG. 8 represent data at the density of 220 kg/m³ and data at the density of 270 kg/m³ in FIG. 1.

As can be seen from FIG. 8, for data represented by black circles, the particle diameter r to the power of −1.5 and the sound speed are generally in proportion to each other, and the relationship of Expression (8) holds true. That is, it is estimated that the porous silica material 1 of the present embodiment has a structure represented by the silica particle binding model described above.

In this case, it is believed from Expression (6) that if water is contained in silica particles, the mass M of the silica particles increases and the sound speed decreases as the water content increases.

However, in practice, the sound speed also increases as the water content increases as indicated by the white triangle and the white circle. It is believed that this is because the contained water exists between the silica particles 2 rather than in the silica particle 2, and the binding energy k of the bond 5 between particles is increased by the hydrogen bond between particle surfaces. As shown in Expression (6), the sound speed v also increases if the binding energy k increases. Since the water content and the sound speed are in the relationship shown in FIG. 7, it is estimated that no such minute pores that water is contained therein are formed in the silica particles 2.

The data represented by the symbols "x" are not on the approximate straight line of data represented by the black circles. From this, it is estimated that the porous silica material whose density is 220 kg/m³ or more has a structure different from the porous silica material 1 of the data represented by the black circles.

Note that Non-Patent Document No. 1 states that a silica aerogel obtained by hydrolyzing tetramethoxysilane under alkaline conditions is formed basically by compact, 1 nm primary particles, some of which gather to form a cluster having a diameter of about 2 nm, thus forming secondary particles. It is believed that with this structure, since the secondary particles have minute pores, the porous silica material of the present invention has a different structure from the silica aerogel disclosed in Non-Patent Document No. 1. It is also believed that such a structural difference occurs because the porous silica material of the present embodiment is produced through slow gelation with a small amount of alkoxide in order to achieve a low density.

Thus, since the porous silica material 1 of the present invention has a water content of 8 wt % or less, the contained water can suppress the increase in the binding energy k between the silica particles 2, and the sound speed of the porous silica material 1 can be decreased.

As shown in FIG. 8, it is estimated that as long as the water content is controlled to be 8 wt % or less, the binding energy k in Expression (8) is generally constant, and the sound speed of the porous silica material 1 is in proportion to the particle diameter r to the power of −1.5. Therefore, it is believed that the sound speed of the porous silica material 1 is lower as the water content is 8 wt % or less and as the particle diameter r to the power of −1.5 is smaller, i.e., as the particle diameter is larger.

Figure 9:
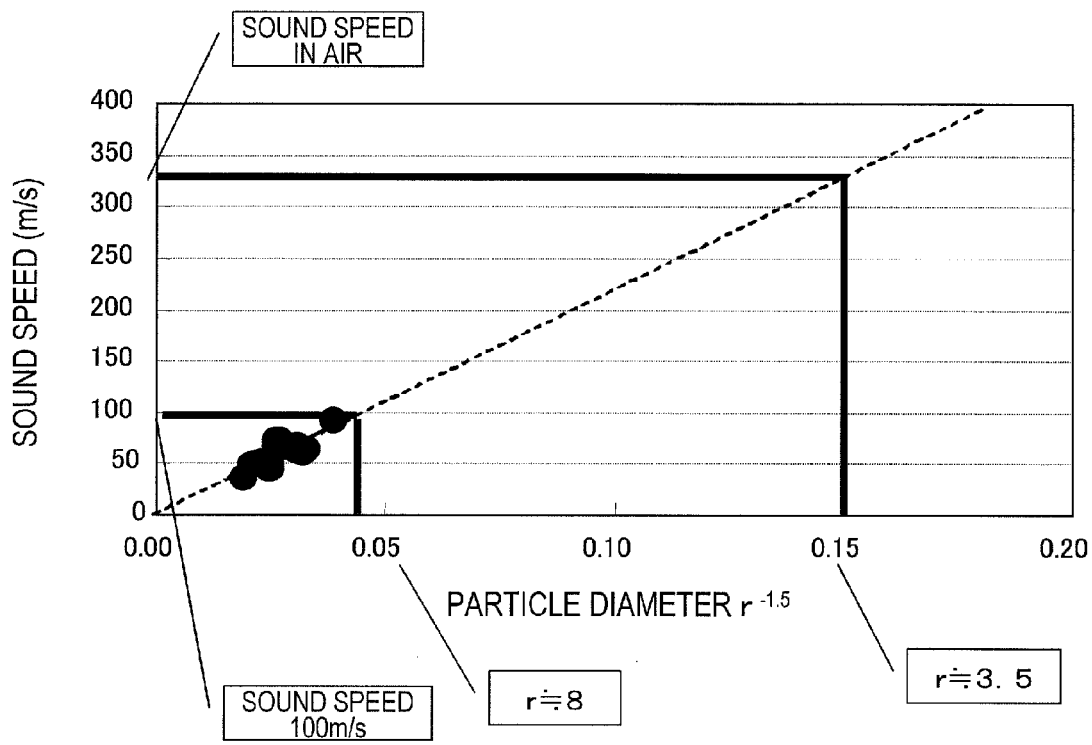
FIG. 9 is another graph showing a relationship between the particle diameter to the power of −1.5 and the sound speed according to an embodiment of a porous silica material.

FIG. 9 is a graph obtained by extrapolating the relationship between the particle diameter r to the power of −1.5 and the sound speed for porous silica materials whose water content is 8 wt % or less. As shown in FIG. 9, the particle diameter r to the power of −1.5 can be set to 0.15 or less in order to obtain the porous silica material 1 whose sound speed is lower than that of the air with the water content being controlled to be 8 wt % or less. Then, the particle diameter r may be 3.5 nm or more. In order to obtain a sound speed of 100 m/s or less, the particle diameter r to the power of −1.5 may be set to 0.05 or less, and the particle diameter r may be 8 nm or more. That is, in order to obtain the porous silica material 1 having a sound speed lower than the sound speed through the air, the particle diameter of the silica particles may be 3.5 nm or more, and in order to obtain the porous silica material 1 having a sound speed of 100 m/s or less, the particle diameter of the silica particles may be 8 nm or more.

Since it is believed that the sound speed of the porous silica material 1 is lower as the particle diameter of the silica particles is larger as described above, there is no upper limit to the particle diameter of the silica particles described above, and the particle diameter of the silica particles may be as large as the production thereof is possible. Note however that particularly where the porous silica material 1 is used as an acousto-optic medium of an optical microphone, if the particle diameter increases, the influence of the Mie scattering is no longer negligible, and the light transmittance of the porous silica material 1 decreases. Therefore, the porous silica material 1 may be in such a range that Rayleigh scattering is the primary scattering. Rayleigh scattering is dominant if $\alpha$ is less than 1 in Expression (9) below, which represents the relationship between the scattering coefficient $\alpha$, the wavelength $\lambda$, and the particle diameter D of the scattering particle.

$$\alpha = \frac{\pi D}{\lambda} \quad (9)$$

Here, for use as an acousto-optic medium, D is about 20 nm where the wavelength of light used in measurement is 600 nm and $\alpha$ is 0.1. Therefore, particularly when the porous silica material 1 is used as an acousto-optic medium of an optical microphone, the particle diameter of the silica particles 2 may be 20 nm or less.

The porous silica material 1 having such characteristics can be manufactured by a known sol-gel method as disclosed in Non-Patent Document No. 1. The water content of the porous silica material 1 can be controlled by a known hydrophobization process that suppresses the containment of water by performing a hydrophobization process on the surface of silica particles. The water content can be adjusted also by drying the produced porous silica material 1 by a method such as heating.

The particle diameter of the silica particles of the porous silica material can be controlled by the reaction condition used when producing a wet gel. Specifically, the particle diameter of the silica particles can be controlled by adjusting the reaction temperature (holding temperature) and the catalyst concentration during the gelation. An example of a method for manufacturing the porous silica material 1 and an example of a method for controlling the water content will be described in the experiment example below.

As described above, the porous silica material of the present embodiment has a structure in which silica particles are connected to one another three-dimensionally, and has a very low density. Therefore, voids, particularly, through holes, are formed between silica particles, which allow propagation of the displacement of positions of silica particles by a sound pressure. Since the through hole is a pore having a constricted part smaller than the mean free path of the air, a sound wave cannot directly propagate through the air filling the voids.

The present inventors have found that the sound speed of such a porous silica material as described above varies depending on the water content, and revealed that it is possible to realize a porous silica material having a low sound speed and a small modulus of elasticity by controlling the water content to be 8 wt % or less. Since the water content is in such a range as described above, a structure is obtained in which silica particles interact with each other via a weak bond, thereby realizing propagation of a sound wave through displacement of the silica particles.

With the porous silica material of the present embodiment, in a state where the water content is constant, particularly where the water content is controlled to be 8 wt % or less, the sound speed of the porous silica material is in proportion to the particle diameter r of the silica particles to the power of −1.5, and it is therefore possible to control the sound speed by adjusting the particle diameter of the silica particles. Therefore, it is possible to realize a porous silica material having an intended sound speed.

Experiment Example

It was demonstrated that the sound speed of a porous silica material varies depending on the water content and the particle diameter of the silica particles. Moreover, porous silica materials of the present embodiment were produced and the physical properties thereof were measured.

1. Production of Porous Silica Material

A porous silica material of vertical dimension 10 mm×horizontal dimension 10 mm×thickness 5 mm was produced. For the porous silica material, tetramethoxysilane (TMOS), as an alkoxide of silicon (Si), was used as a main material. Other than tetramethoxysilane, in some cases, diisobutyldimethoxysilane is mixed in, for example. Mixing in diisobutyldimethoxysilane has an effect of lowering the sound speed. Ethanol was used as a solvent.

After thoroughly mixing alkoxide and ethanol together, water was added for hydrolysis and polycondensation reaction. In this process, ammonia water was used instead of water to obtain a catalytic effect. Table 1 below shows examples of the preparation condition (mass ratio) of the porous silica material. The density of a porous silica material is determined by the ratio between ethanol and alkoxide. That is, it is possible to vary the density of the porous silica material by adjusting the ratio between ethanol and alkoxide.

TABLE 1

| Preparation condition (mass ratio) | | | Density of produced porous silica material |
|---|---|---|---|
| Alkoxide | Ethanol | Ammonia water | (kg/m³) |
| 1 | 0.04 | 0.47 | 300 |
| 1 | 0.24 | 0.47 | 250 |
| 1 | 0.93 | 0.47 | 200 |
| 1 | 1.62 | 0.47 | 150 |
| 1 | 2.99 | 0.47 | 100 |
| 1 | 7.14 | 0.47 | 50 |

The concentration of ammonia water is 0.01 N to 1 N. The concentration is not constant so that the gelation time is made generally equal by changing the catalyst concentration because gelation takes a longer time for a sol liquid of a preparation condition that aims for a lower density. After preparation, the sol liquid was aged for 24 hours in a thermostat oven at 40° C. The catalyst concentration was adjusted so that gelation would be complete within the 24 hours. The higher the catalyst concentration, the shorter the gelation time is.

Tetramethoxysilane is soluble in alcohol but is insoluble in water. Therefore, ethanol serves to uniformly mix tetramethoxysilane and water together, in addition to adjusting the density. In order to increase the density as shown in Table 1, the ratio of ethanol is decreased. If the density is higher than 300 kg/m³, the ratio of ethanol becomes very small, and it will be difficult to produce a uniform gel because water is not mixed uniformly. The density may be smaller than 300 kg/m³ also because it would otherwise not suit the objective of the present invention of lowering the modulus of elasticity.

A wet gel was produced for hydrolysis and polymerization reaction of a sol liquid by aging in a thermostat oven at 40° C. for 24 hours.

Then, the wet gel was immersed in ethanol for about hours to clean and remove ammonia water and methanol, which is a reactant. Next, the hydrophobization process was performed. The hydrophobization process liquid was produced by mixing together 38 g of dimethyldimethoxysilane, 38 g of ethanol, 2.05 g of water, and 5.55 g of 1 N ammonia water as a catalyst. The wet gel was immersed in the produced hydrophobization process liquid and allowed to react over night at 70° C. After the hydrophobization process, the treatment liquid was discharged, and the product was immersed in fresh ethanol for 24 hours for cleaning. Then, supercritical drying using carbon dioxide was performed under a condition of 17 MPa and 80° C., thereby obtaining a porous silica material, which is a dried gel.

Porous silica materials of different silica particle sizes are produced by varying the gelation time. The silica particles are larger when the gelation time is longer, and the silica particles are smaller than the gelation time is shorter. The gelation time can be varied by the density of the sol liquid, the aging temperature or the catalyst concentration during gelation, and various other factors.

Figure 10:
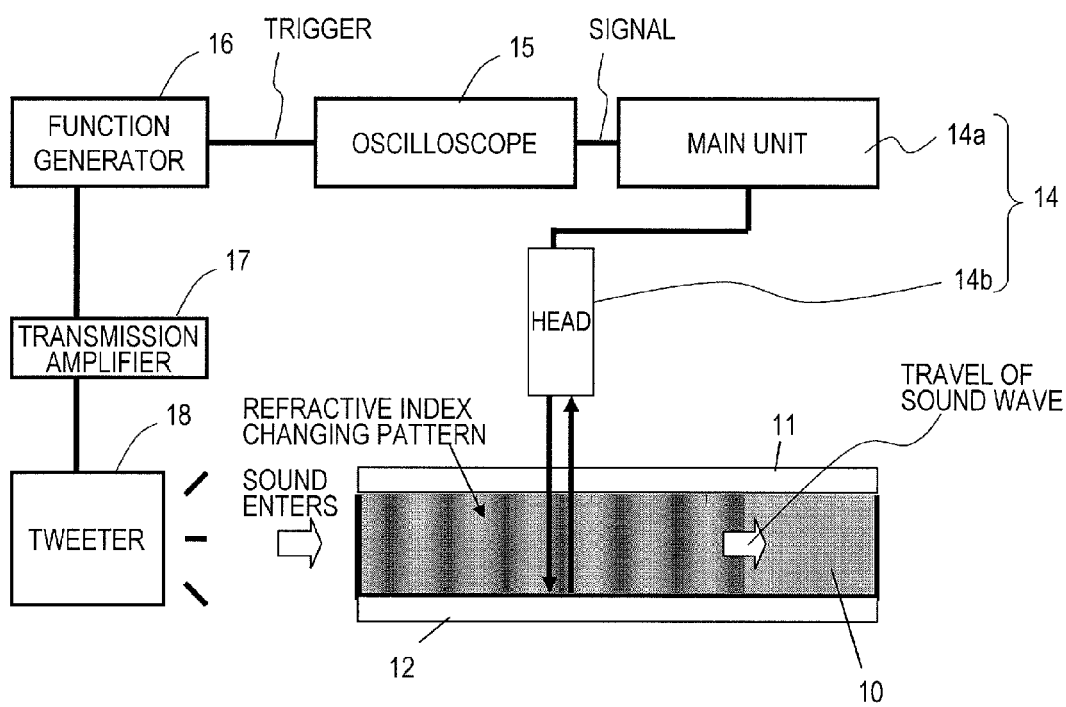
FIG. 10 is a diagram showing a configuration of a non-contact sound speed measurement system used in an experiment example for examining physical properties of an embodiment of a porous silica material.

2. Sound Speed Measurement of Sound Wave Propagating Through Produced Porous Silica Material The sound speed was measured for the produced porous silica materials. First, the method of sound speed measurement will be described. FIG. 10 is a diagram showing the configuration of a non-contact sound speed measurement system using an LDV. As shown in FIG. 10, a produced porous silica material 10 was placed on two opposing surfaces, other than the surface through which the sound wave enters, and sandwiched and held between a light-transmissive transparent acrylic plate 11 and a support 12 having a mirror surface. The laser beam output from a head 14b (OFV353 from Polytec, Inc.) of an LDV 14 arranged on the side of the transparent acrylic plate 11 passes through the porous silica material 10, is reflected by the mirror surface of the support 12, and passes again through the porous silica material 10 to return to the head 14b. The head 14b can be moved freely in accordance with the point at which the porous silica material is measured. The head 14b is connected to a calculation section 14a (OFV3001 from Polytec, Inc.) of the LDV 14. The signal obtained from the calculation section 14a of the LDV was observed by an oscilloscope 15 (TDS744A from Tektronix, Inc.).

A burst signal made of a single sinusoidal wave having a frequency of 40 KHz was generated by a function generator 16 (1930 from NF Corporation), and the produced signal was amplified through a transmission amplifier 17 (M-10X from Pioneer Corporation), oscillating the sound wave of the burst signal from a tweeter 18 (PT-R4 from Pioneer Corporation). The tweeter 18 was placed at a distance of about 210 mm from the surface of the porous silica material 10 through which the sound wave enters.

The burst signal produced from the function generator 16 was also input to the oscilloscope 15 as a trigger.

Figure 11:
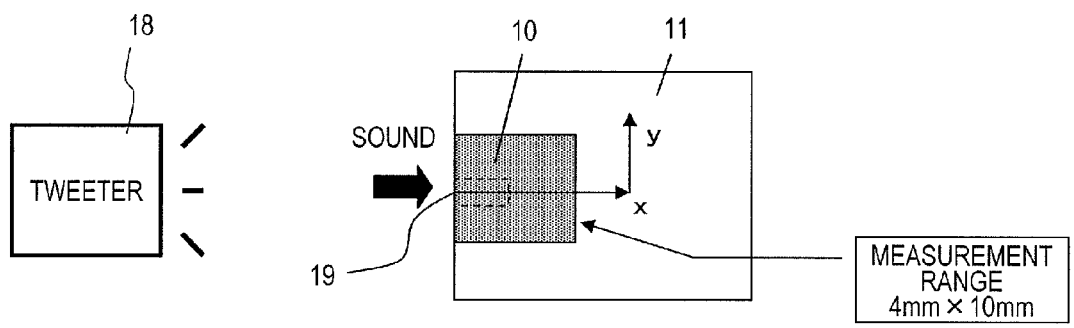
FIG. 11 is a diagram showing an area of the porous silica material across which the sound speed was measured in the configuration shown in FIG. 10.

FIG. 11 shows the range of measurement of the non-contact sound speed measurement system shown in FIG. 3. FIG. 11 is a diagram showing the porous silica material 10 as viewed from the side of the head 14b in FIG. 10.

A sound wave incidence center point 19 of the porous silica material 10 is the center point of the sound wave incidence surface of the porous silica material 10. With the sound wave incidence center point 19 as the origin, the direction parallel to the sound wave propagation direction is defined as the x direction. The direction perpendicular to the sound wave propagation direction is defined as the y direction. The measurement was performed at a pitch of 0.2 mm across a range extending from the sound wave incidence center point 19 over 10 mm in the x direction and over ±2 mm in the y direction.

The central portion of the sound wave incidence surface is measured because it is farther away from the boundary between the porous silica material 10 and the transparent acrylic plate 11 than other portions. A wave propagating through the porous silica material 10 is reflected by the transparent acrylic plate 11. Therefore, in the vicinity of the boundary between the porous silica material 10 and the transparent acrylic plate 11, the propagating wave and the reflected wave coexist with each other.

Figure 12:
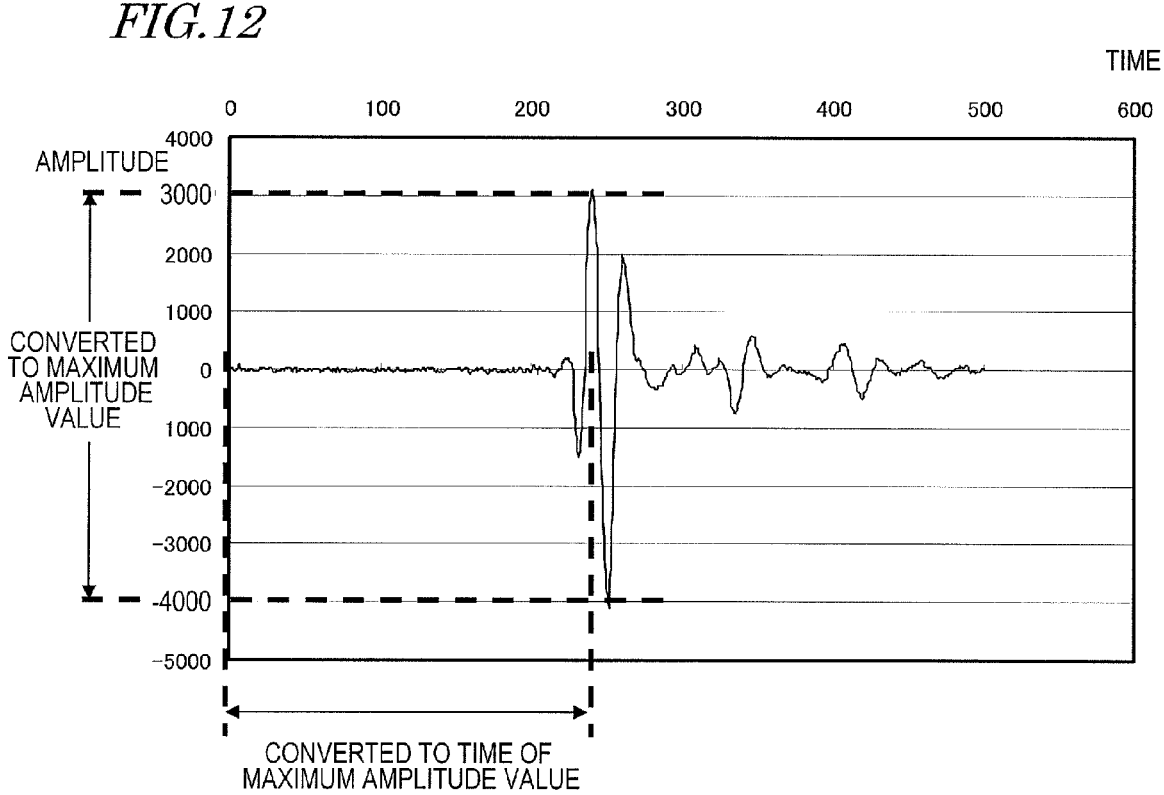
FIG. 12 is a diagram showing an example of a waveform observed on an oscilloscope in the configuration shown in FIG. 10.

FIG. 12 shows the result of observing, with the oscilloscope 15, the output time waveform measured by the LDV at an arbitrary point on the porous silica material 10 when a pulsed sound wave signal is input. In FIG. 12, the horizontal axis represents the measurement time of the oscilloscope 15, and the vertical axis represents the detected signal amplitude (average value over 50 iterations). From the time of arrival of the maximum amplitude of the observed signal, it is possible to calculate the amount of time since the burst wave is oscillated from the tweeter 18, and to convert it to the velocity v of the sound wave measured by the head 14b. The vertical axis can be converted to the amplitude of the sound wave.

Figure 13:
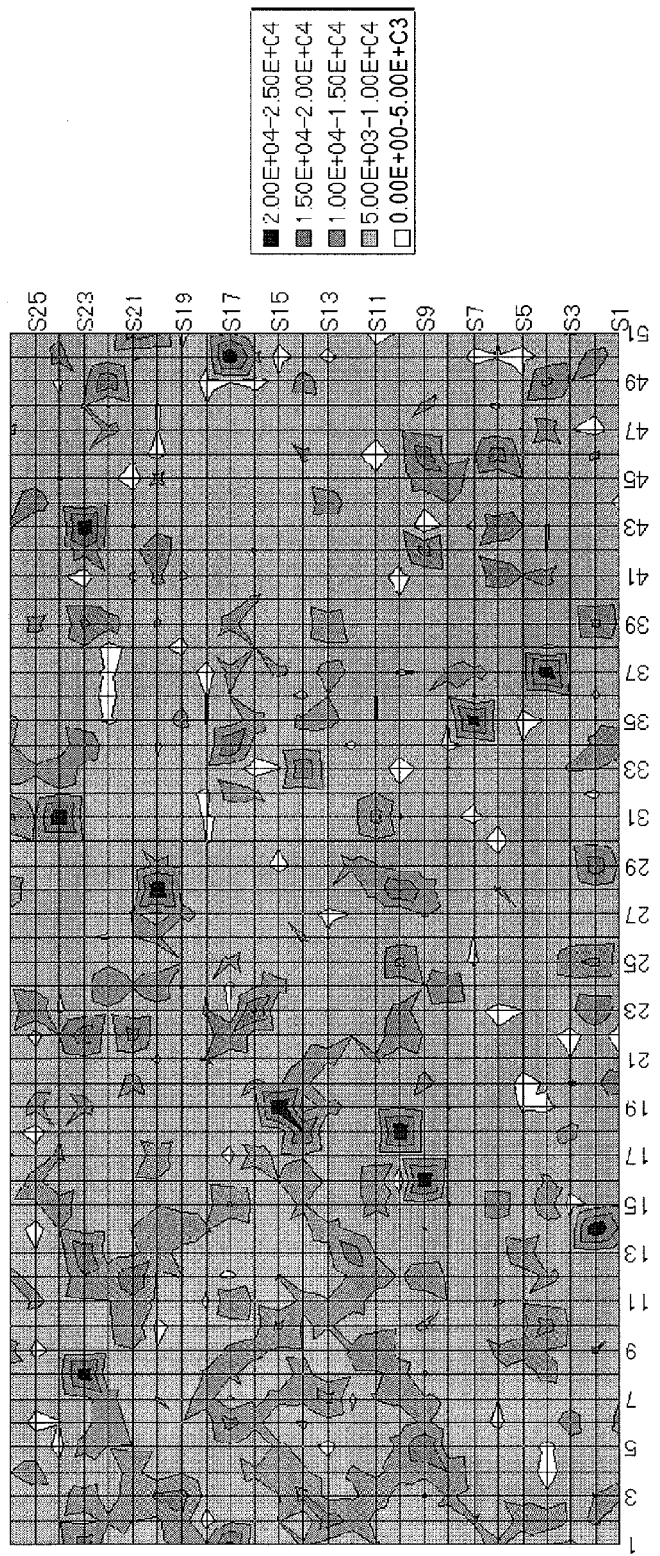
FIG. 13 is a diagram showing the measurement results obtained by the configuration shown in FIG. 10, showing an example of a map displaying maximum amplitude values.

FIG. 13 is a diagram obtained by mapping the maximum amplitude values at measurement points measured at a pitch of 0.2 mm across the range of measurement. In FIG. 13, the sound wave enters from the left side as indicated by an arrow. The magnitude of the maximum amplitude value is represented by shading. A dark-colored portion represents a large amplitude value, and a light-colored portion represents a small amplitude value. From FIG. 13, it can be seen that the shading is not dependent on the measurement points (positions) but is distributed.

Figure 14:
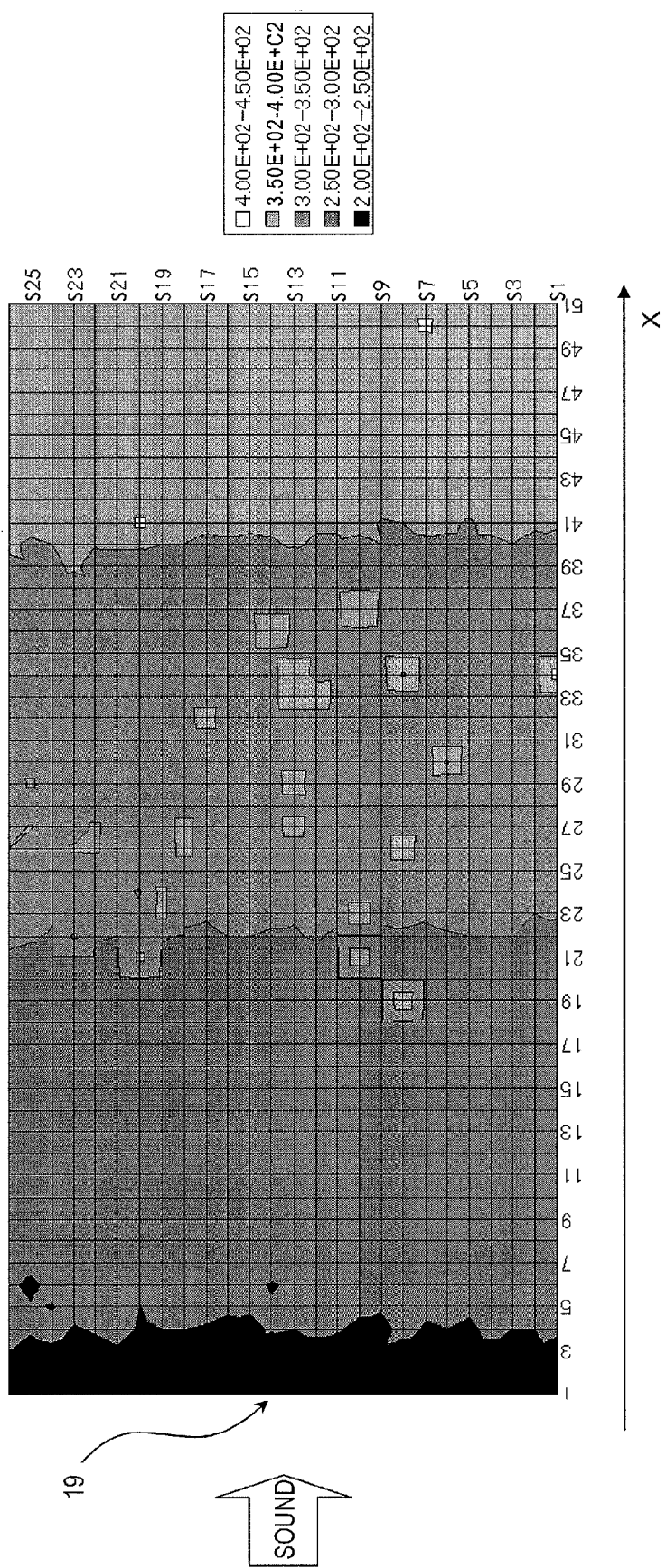
FIG. 14 is a diagram showing the measurement results obtained by the configuration shown in FIG. 10, showing an example of a map displaying points in time of maximum amplitude values.

FIG. 14 is a diagram obtained by mapping the points in time when the maximum amplitude values were obtained at different measurement points. From FIG. 14, it can be seen that the points in time at which the maximum amplitude values were measured are substantially constant in the y-axis direction, and there are more changes farther away from the tweeter 18 in the x-axis direction. Thus, it can be seen that the sound wave is propagating parallel to the y-axis direction.

From FIGS. 13 and 14, it can be seen that the sound wave having entered the porous silica material 10 is propagating through the porous silica material with substantially no directionality across the measured range.

Figure 15:
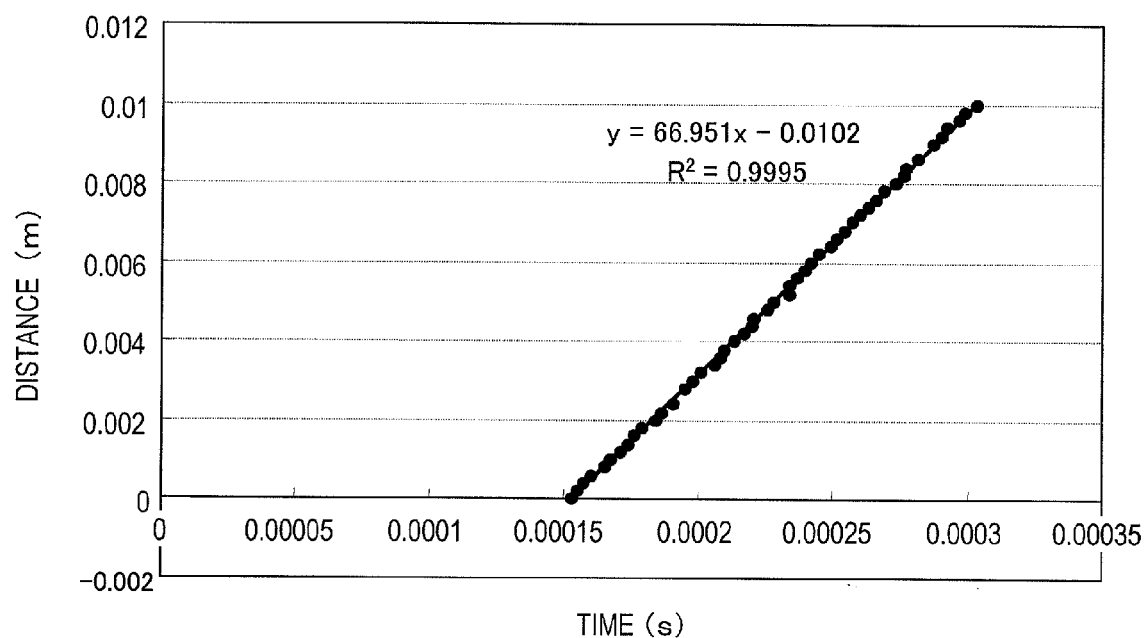
FIG. 15 is a diagram showing the measurement results obtained by the configuration shown in FIG. 10, showing an example of a graph for obtaining the sound speed.

FIG. 15 shows the results of measurement at a pitch of 0.2 mm along a straight line that is at 10 mm in the x direction from the sound wave incidence center point 19, wherein the vertical axis represents the distance from the sound wave incidence center point 19 to the measurement point, and the horizontal axis represents the points in time at which the maximum amplitude values were obtained. The gradient of this graph is the sound speed. FIG. 15 shows the results of measurement for a porous silica material having a density of 140 kg/m$^3$, wherein the measurement results were approximated by a straight line to obtain the gradient. From the gradient, it can be seen that the sound speed is about 67 m/s.

Figure 16:
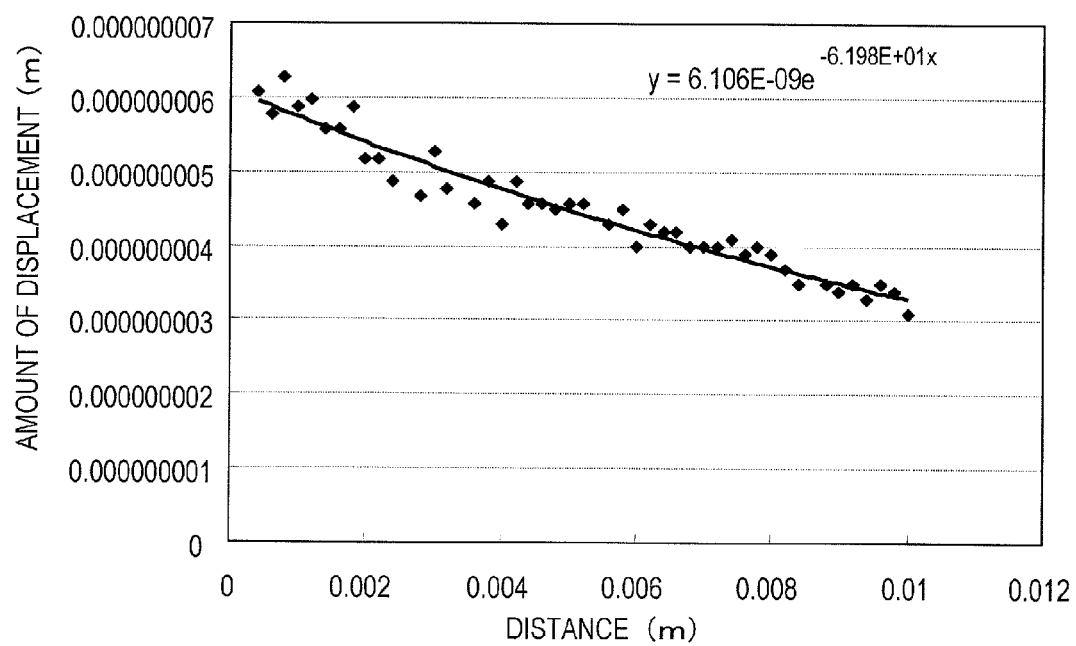
FIG. 16 is an example of a graph for obtaining the sensitivity, showing the measurement results obtained by the configuration shown in FIG. 10.

FIG. 16 shows the results of measurement at a pitch of 0.2 mm along a straight line that is at 10 mm in the x direction from the sound wave incidence center point 19, as with FIG. 15, wherein the vertical axis represents the amount of displacement ΔL calculated from the maximum amplitude values (velocity v) using Expression (5), and the horizontal axis represents the distance from the sound wave incidence center point 19 to measurement point. FIG. 16 shows that the sound wave propagating through the porous silica material 10 gradually attenuates as the distance from the sound wave incidence center point 19 to the measurement point increases.

The sensitivity of an optical microphone is given in terms of the signal voltage that is obtained when a sound of a predetermined reference volume is given. In other words, it is determined by the amount of displacement (ΔL/L) per unit length at the sound wave incidence center point 19 when a sound pressure of 1 Pa is input to the porous silica material.

The amount of displacement ΔL at the sound wave incidence center point 19 is the value of y for distance i.e., the coefficient a, when the measurement results shown in FIG. 16 are approximated by the exponential function $y=a \cdot e^{bx}$.

For the measurement results shown in FIG. 16, the coefficient a is $6.1 \times 10^{-9}$ m. Since L is the optical length of the laser beam, L is twice the thickness ($5 \times 10^{-3}$ m) of the porous silica material 10, i.e., $10^{-2}$ m. The incident sound pressure was obtained by measuring the sound pressure at the sound wave incidence center point 19 using a reference microphone (Type 4939 from Bruel & Kjaer).

FIG. 1 shows the relationship between porous silica materials of various densities and the sound speed obtained as described above. As already described above, the density and the sound speed are generally in proportion to each other while the density is in the range from 300 kg/m$^3$ to 100 kg/m$^3$, the sound speed tends to rather increase when the density decreases below 100 kg/m$^3$. Note however that it is believed that a porous silica material has a structure different from that of the porous silica material of the present example for a density range of 220 kg/m$^3$ or more, as described above. The relationship between the density and the modulus of elasticity is as shown in FIG. 2. The modulus of elasticity not being in proportion to the density indicates an increase in the sound speed.

Figure 17:
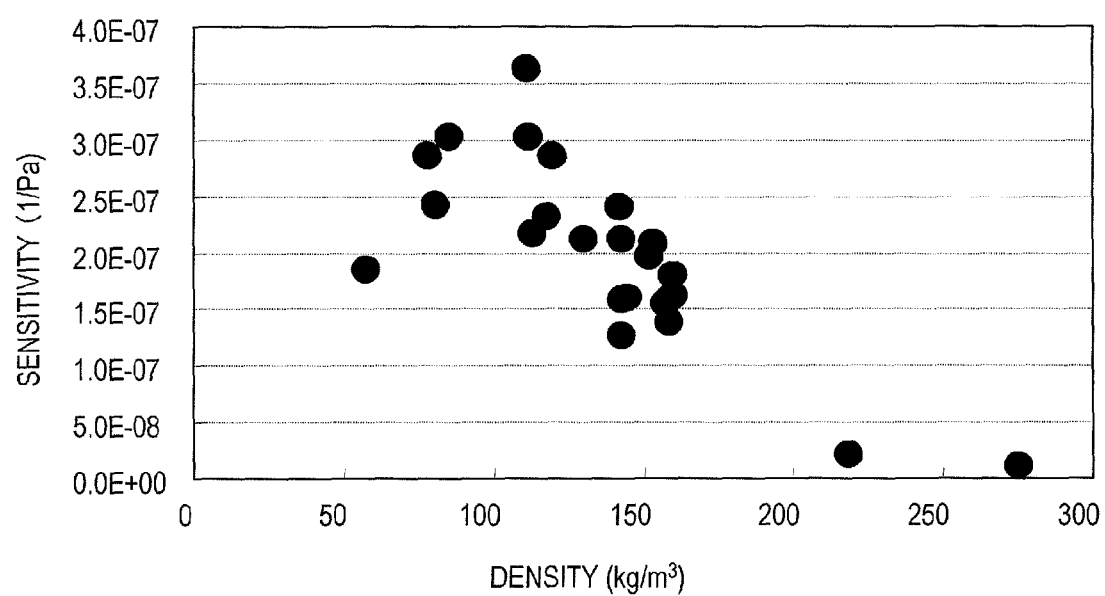
FIG. 17 is a graph showing a relationship between the density and the sensitivity according to an embodiment of a porous silica material.

FIG. 17 shows the relationship between the density obtained by the method described above and the sensitivity as an optical microphone. From the results shown in FIG. 17, it can be seen that even if the density of the porous silica material is decreased, the sensitivity does not increase if the density is less than 100 kg/m$^3$. Note that the data are more dispersed in FIG. 17 as compared with the results shown in FIG. 1 and FIG. 2. This is because the value of the sensitivity is calculated based on the measurement data shown in FIG. 16, and the output value (maximum value) of the LDV vibrometer used for calculating the value of the amount of displacement ΔL is easily influenced by a scratch, dirt, etc., on the surface of the porous silica material. In contrast, the sound speed and the modulus of elasticity shown in FIG. 1 and FIG. 2 are based on the time of arrival of a sound wave and are less prone to errors.

From FIG. 17, the sensitivity of an optical microphone using a porous silica material whose density is 220 kg/m³ or more has a smaller amount of dependence on the density. Therefore, it can be seen that when the density is less than 220 kg/m³, the sensitivity of a microphone is more influenced by the modulus of elasticity of the porous silica material. Therefore, the advantageous effect of the present invention that the sensitivity of an optical microphone is improved by decreasing the modulus of elasticity is more pronounced when the density is less than 220 kg/m³. That is, the density of the porous silica material may be less than 220 kg/m³. If the density is less than 50 kg/m³, it will be very fragile and easily break. Therefore the density may be greater than 50 kg/m³. The lower limit for the density in the present example was 57 kg/m³.

3. Estimation of Structure of Porous Silica Material

The produced porous silica material was observed by using an SEM, and it was confirmed that the obtained porous silica material has a structure in which a plurality of silica particles 2 are connected to one another three-dimensionally as shown in FIG. 3.

Figure 18:
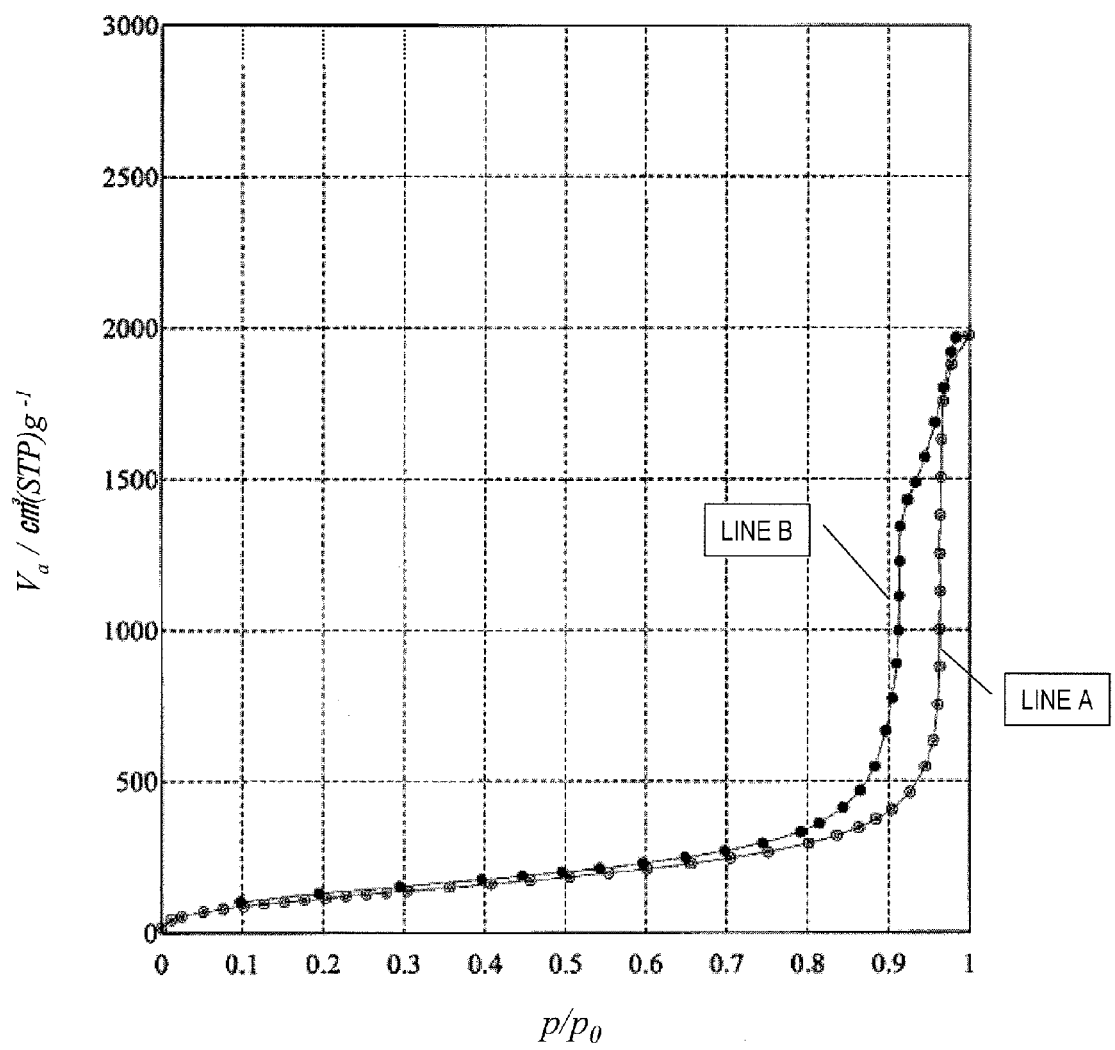
FIG. 18 is a graph showing nitrogen adsorption isotherms according to an embodiment of a porous silica material.

In order to conduct an in-depth study on the structure of the porous silica material, we first focused on the pore structure of the porous silica material. FIG. 18 shows nitrogen adsorption isotherms at 77 K of the porous silica material whose density is about 150 kg/m³. A "nitrogen adsorption isotherm" is a graph obtained by measuring changes in the pressure and the amount of adsorption while keeping the material at a constant temperature (at 77 K in this experiment). The horizontal axis of FIG. 18 represents the relative pressure (P/Pd obtained by dividing the equilibrium pressure by the saturated vapor pressure, which is a value of 0 to 1. $P/P_0 \approx 1$ means that the adsorption gas is condensed in the sample tube. That is, in the adsorption isotherm, at a pressure lower than the saturated vapor pressure, an interaction force between the solid and the adsorption molecule starts acting, thus initiating adsorption and condensation, thereby measuring a higher adsorbate density than in the gas phase. The vertical axis of FIG. 18 represents the amount of adsorption in terms of the volume of the gas V/cm³ (STP)g⁻¹ in the standard state (0° C., 1 atm). After the porous silica material was heated to 110° C. in a vacuum, the nitrogen adsorption isotherm was measured by using BELSORP-miniII from Bel Japan, Inc.

Line A in FIG. 18 represents measurement values evaluated during the capillary condensation process of the nitrogen gas into the pore, and Line B represents measurement values evaluated during the evaporation process of the liquid nitrogen which had been condensed in the pores. The adsorption-desorption hysteresis is generally suggesting that pores of different diameters are connected to one another.

From this, it was confirmed that the pores of the porous silica material have a gourd-shaped structure in which the cavity portions 3 and the constriction portions 4 are connected to one another as shown in FIG. 5. In the adsorption process, since nitrogen adsorption starts from the cavity portions 3, the inner diameter L1 of the cavity portion 3 dominates the adsorption process. It is believed that in the evaporation process, since desorption starts from the constriction portion 4, the inner diameter L2 of the constriction portion 4 dominates the evaporation process.

Figure 19:
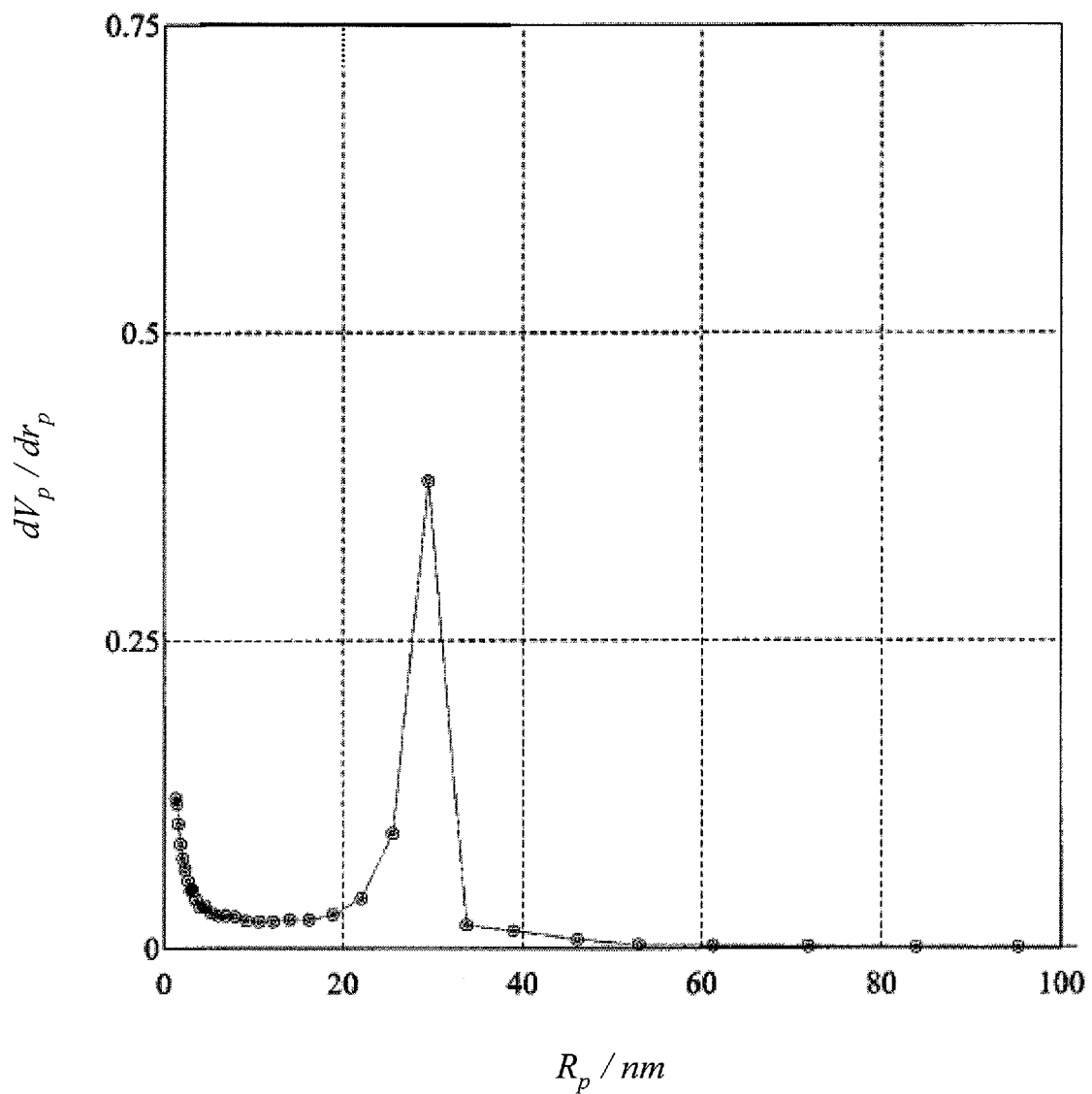
FIG. 19 is a diagram showing the results of calculation by the BJH method from the nitrogen adsorption isotherm A shown in FIG. 18.
Figure 20:
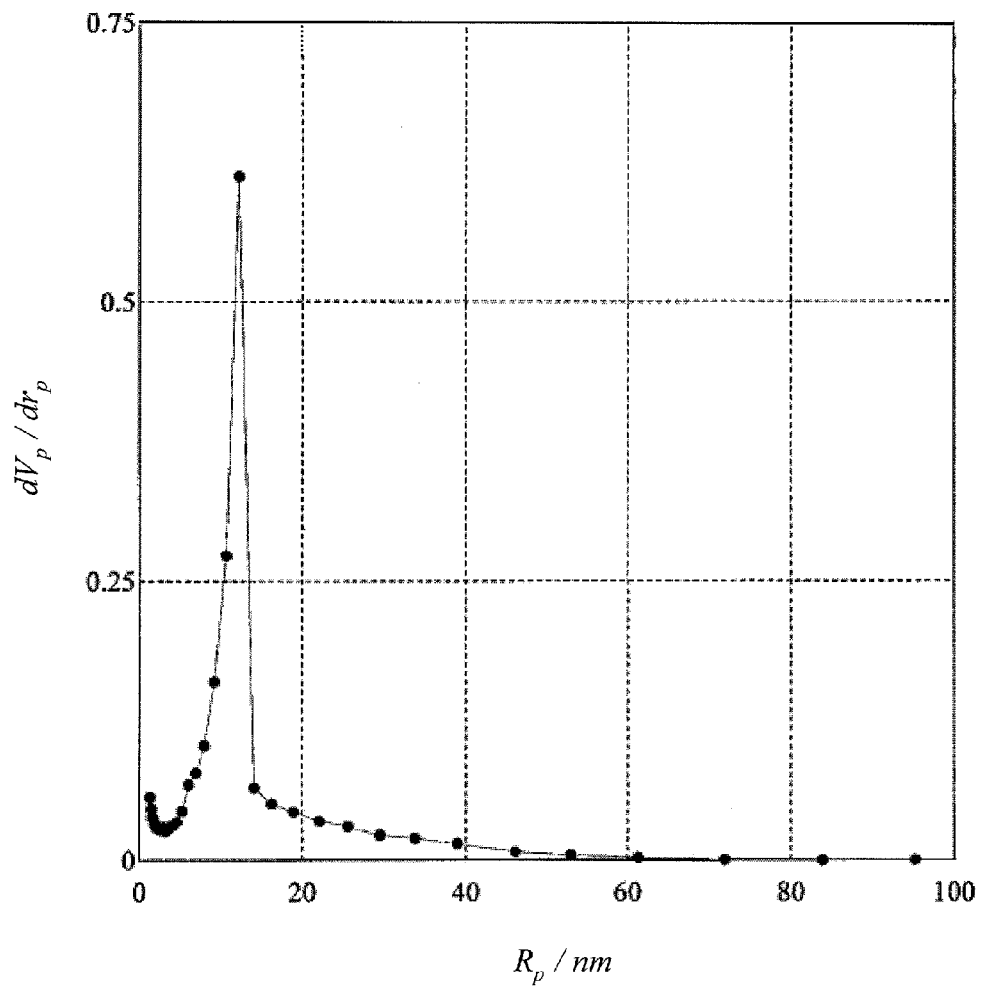
FIG. 20 is a diagram showing the results of calculation by the BJH method from the nitrogen adsorption isotherm B shown in FIG. 18.

From the nitrogen adsorption isotherms A and B shown in FIG. 18, the respective pore distributions were calculated by the BJH method. The BJH method is a commonly-used method for analyzing the pore distribution, which was proposed in 1951 by Barrett, Joyner and Halenda. FIG. 19 shows the results of calculation by the BJH method obtained from Line A of FIG. 18, and FIG. 20 shows the results of calculation by the BJH method obtained from Line B of FIG. 18. The horizontal axis of FIG. 19 and FIG. 20 represents the pore radius, and the vertical axis represents the pore volume. As a result of calculation by the BJH method, the pore radius obtained from Line A has a distribution centered at about 30 nm. The pore radius obtained from Line B has a distribution centered at about 12 nm. That is, it was confirmed that the cavity portion 3 is a pore whose diameter (inner diameter) has a distribution centered at about 60 nm, and the constriction portion 4 connecting to the cavity portion 3 is a pore whose diameter (inner diameter) has a distribution centered at about 25 nm.

From these results, it was confirmed that while the pore of the porous silica material is a pore, it is intermittently divided by constrictions whose pore diameter is smaller than the mean free path of the air, and that the sound wave hardly propagates through the air in the pore. That is, it was confirmed that the sound wave in the porous silica material propagates primarily through the silica skeleton.

It is estimated that the silica particles of the porous silica material of the present invention are non-porous particles from the nitrogen adsorption isotherm shown in FIG. 18. Typically, the relative pressure on the horizontal axis of the nitrogen adsorption isotherm being 0.2 or less corresponds to a pore whose pore diameter is 0.7 nm to 2 nm (hereinafter referred to as a "micro-pore"). If there are micro-pores in the silica particles, the nitrogen adsorption should proceed rapidly at relative pressures of 0.2 or less. However, the nitrogen adsorption isotherm of FIG. 18 only shows an increase that generally accounts for monomolecular adsorption for relative pressures of 0.2 or less. Therefore, it is estimated that there are no micro-pores in the porous silica material of the present invention. Since such micro-pores do not exist in the silica particles of the porous silica material, it is presumed that the silica particles are not forming such secondary particles that have micro-pores of 0.7 nm to 2 nm.

4. Confirmation of Propagation of Sound Wave Through Silica Skeleton, and Confirmation of Relationship Between Particle Diameter of Silica Particles and Sound Speed The diameter of the silica particles was measured in order to confirm that it is possible to model the binding of a silica particle in the porous silica material with an adjacent silica particle via a bond having a predetermined binding energy as shown in FIG. 6. The measurement was performed by X-ray small-angle scattering. For the X-ray small-angle scattering, a multi-purpose X-ray diffractometer, RINT-TTR III from Rigaku Corporation, was used.

Figure 21:
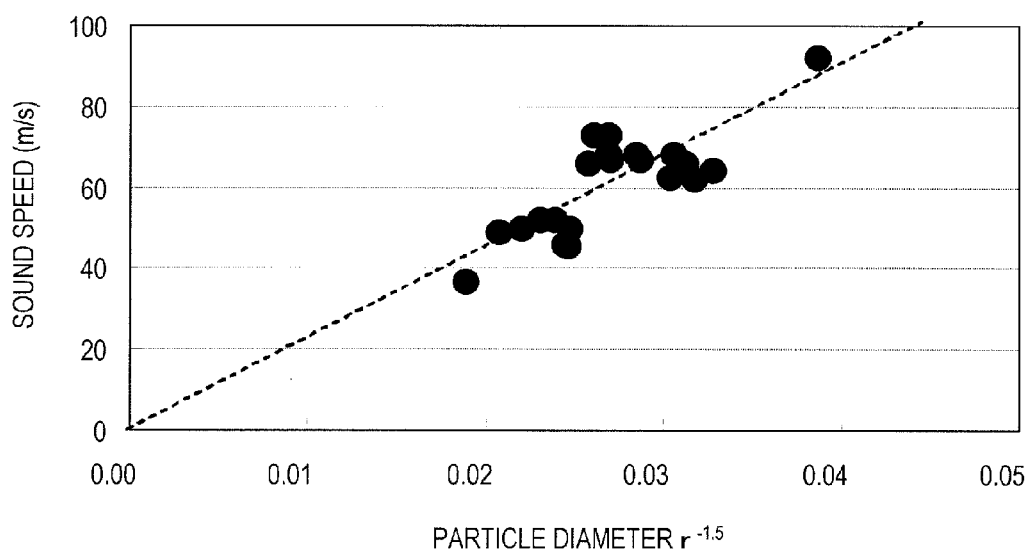
FIG. 21 is a graph showing a relationship between the particle diameter to the power of −1.5 and the sound speed according to an embodiment of a porous silica material of the present invention.

FIG. 21 shows the relationship between the silica the particle diameter r to the power of −1.5 and the sound speed. In FIG. 21, the horizontal axis represents the particle diameter r to the power of −1.5, and the vertical axis represents the sound speed. FIG. 21 was prepared using the same measurement data as FIG. 1. From FIG. 21, it is found that a porous silica material of which the density and the sound speed are in a linear relationship with the intercept at zero in FIG. 1 (data in FIG. 1 of which the density is 100 kg/m³ or more), and a porous silica material of which the density and the sound speed are not in a linear relationship with the intercept at zero (data in FIG. 1 of which the density is 100 kg/m³ or less) both follow the same proportional straight line passing through the origin. That is, with a porous silica material of a lower sound speed, the silica particles have a larger particle diameter and are heavier. The relationship of Expression (8) holds true, and it is estimated that a sound wave propagates through the porous silica material by the model shown in FIG. 6. From Expression (8), the binding energy of the silica particles is proportional to the gradient of the approximate straight line indicated by a broken line in FIG. 21. Thus, it can be seen that the sound speed decreases as the binding energy of the silica particles decreases. It is believed that the binding energy of the silica particles derives from cross-linking by covalent bond, or the like, during gelation.

The reason why the silica particles of a low-density porous silica material are heavy is believed to be as follows. Since a low-density sol liquid has a small number of nuclei to be silica particles, gelation takes a longer time. During the slow gelation, silica particles grow larger, and the particles are connected with one another to gelate. Therefore, a porous silica material having a lower density has heavier silica particles. Since a porous silica material having a lower density is gelated within about 24 hours, the speed of gelation is adjusted by, for example, increasing the catalyst concentration. At what point in time over the 24 hours each individual porous silica material is gelated is unknown, but it is presumed that the gelation time is longer as the density decreases for a porous silica material whose density is greater than 100 $kg/m^3$, and the gelation time is shorter as the density decreases for a porous silica material whose density is less than 100 $kg/m^3$. That is, it is inferred that the mechanism of the gelation reaction switches in the vicinity of a density of 100 $kg/m^3$.

Thus, it is presumed that the weight of the particles is determined by the gelation time, which is determined by the process conditions such as the density and the catalyst concentration, and it is therefore possible to produce a porous silica material of which the silica particles have a larger particle diameter by changing the environmental temperature during gelation or changing the concentration of the catalyst to be dripped.

It is believed that the sound speed is lower as the particle diameter of the silica particles is larger, and it can therefore be seen that the silica particle diameter r needs to be greater than about 3.5 nm in order to realize a lower sound speed than the sound speed of the air (340 m/s) as described above with reference to FIG. 9.

Figure 22:
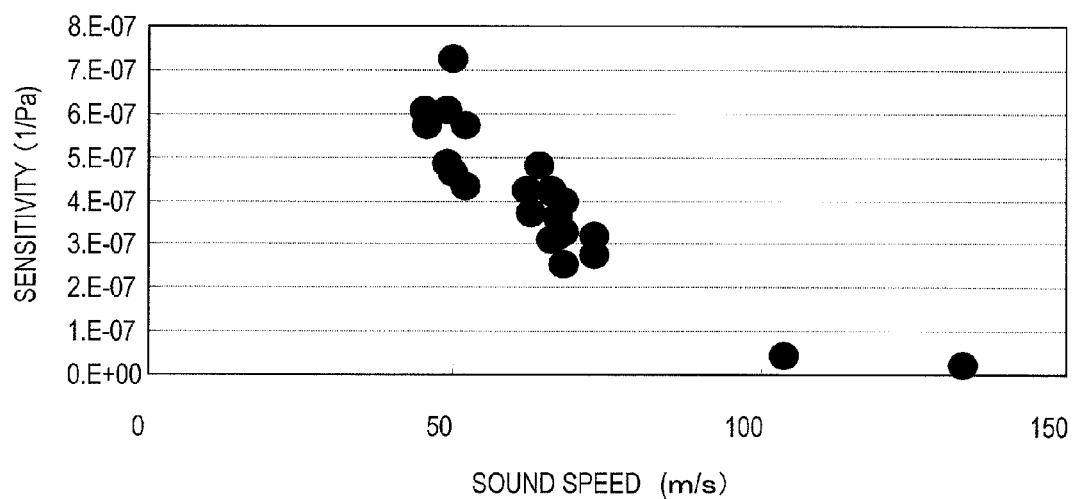
FIG. 22 is a graph showing a relationship between the sound speed and the sensitivity according to an embodiment of a porous silica material.

FIG. 22 is a graph showing the relationship between the sound speed and the sensitivity. The horizontal axis represents the sound speed of the porous silica material, and the vertical axis represents the sensitivity. From FIG. 22, it can be seen that the sensitivity of an optical microphone improves rapidly when the sound speed decreases below 100 m/s. It can be seen from FIG. 9 that the silica particle diameter may be greater than 8 nm in order to realize a porous silica material having a sound speed lower than 100 m/s. That is, in order to more dramatically improve the sensitivity of an optical microphone, the silica particle diameter may be greater than 8 nm. It can be seen from FIG. 1 that a porous silica material whose density is less than 220 $kg/m^3$ will have a sound speed less than 100 m/s. Therefore, the density may be less than 220 $kg/m^3$.

5. Confirmation of Relationship Between Water Content of Porous Silica Material and Sound Speed The sound speed of a porous silica material was measured while varying the water content.

Typically, when water is contained in a porous silica material which has not been subjected to a hydrophobization process, the hydroxyl group on the surface of the silica particles reacts with water, thereby clouding the porous silica material. If water is contained and evaporated repeatedly, the structure may be destroyed, leading to alterations such as a crack or collapse, due to the surface tension of water upon evaporation. The experiment was conducted while taking such aging into consideration.

Five samples S1 to S5 as follows were prepared.

For Sample S1, a porous silica material was produced and then subjected to a hydrophobization process. For Sample S2, a porous silica material was produced, and stored in a dry thermostat oven at 100° C. without a hydrophobization process. For Sample S3, a porous silica material was produced, and stored in the air for 24 hours without a hydrophobization process. For Sample S4, a porous silica material was produced, and stored in a thermostat oven at 40° C. and a humidity of 80% for 24 hours without a hydrophobization process. For Sample S5, a porous silica material was produced, and stored in a thermostat oven at 40° C. and a humidity of 80% for 48 hours without a hydrophobization process.

As described above, the water content of a porous silica material can be adjusted based on whether the porous silica material is subjected to a hydrophobization process and by storing the porous silica material at a predetermined humidity.

Upon sample production, the transparency did not visually significantly vary between the porous silica materials from S1 to S5. In order to prevent the structure from being destroyed due to the evaporation of water once contained therein, sound speed measurement was conducted immediately after sample production. A measurement system shown in FIG. 10 was used for the sound speed measurement. Even after the sound speed measurement, samples had no alterations visually. Therefore, it is believed that the samples had not undergone structural alterations due to water evaporation.

After the sound speed measurement, the water content was measured. The water content was measured using a differential thermal analyzer, Thermo plus TG-DTA, TG-8120, from Rigaku Corporation. About 7 mg to 10 mg of each of Samples S1 to S5 was taken and coarsely powdered, which was set in TG-8120 in an aluminum cup. The contained water weight was determined as a weight decrease experienced when increasing the temperature in the air from room temperature to 200° C. by 10° C. every minute using TG-8120.

The obtained results are shown in Table 2 below and in FIG. 7. The horizontal axis represents the water content proportion (wt %) obtained by dividing the contained water weight by the weight of each sample before being heated, and the vertical axis represents the sound speed. The particle diameters of Samples S2 to S5 were not measured, but they were estimated to be the same as S1, i.e., about 11.8 nm. This is because the only difference between the manufacturing method for Sample S1 and those for Samples S2 to S5 is the presence/absence of the hydrophobization process, which does not influence the particle diameter of the sample. From these results, Was confirmed that the sound speed increases when the water content is 10 wt % or more.

TABLE 2

| Sample | Density ($kg/m^3$) | Particle diameter (nm) | Water content (wt %) | Sound speed (m/s) |
|---|---|---|---|---|
| S1(□) | 111 | 11.8 | 0.79 | 50 |
| S2(■) | 99 | (≈11.8) | 6.19 | 51 |
| S3(▲) | 100 | (≈11.8) | 7.72 | 55 |
| S4(▲) | 102 | (≈11.8) | 10.11 | 83 |
| S5(○) | 104 | (≈11.8) | 12.22 | 275 |

Figure 23:
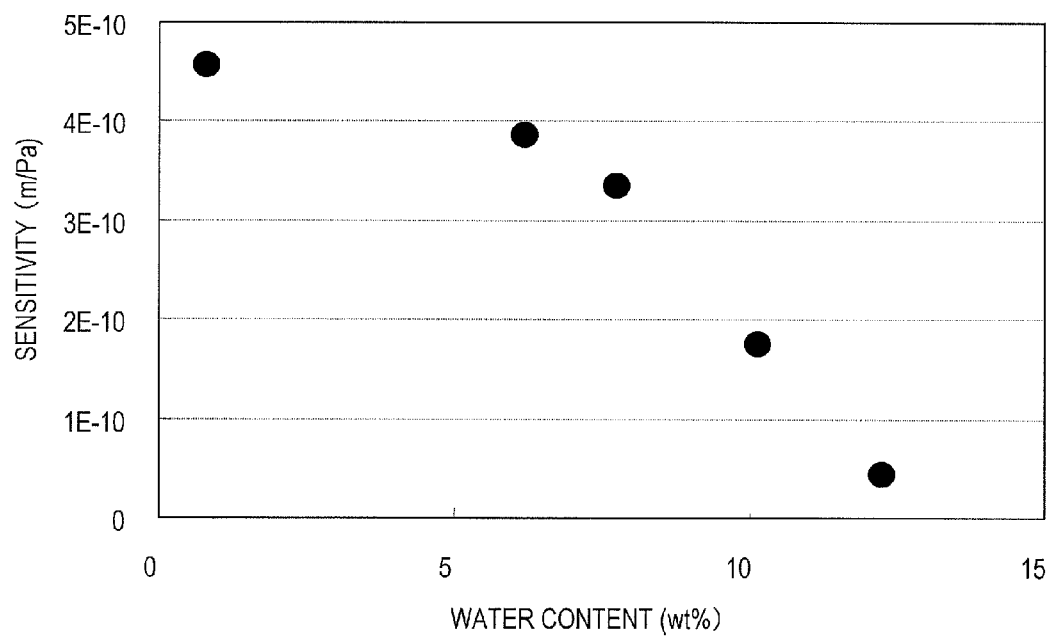
FIG. 23 is a graph showing a relationship between the water content and the sensitivity according to an embodiment of a porous silica material.

FIG. 23 shows the relationship between the water content and the sensitivity. As with FIG. 7, the horizontal axis represents the water content proportion (wt %) obtained by dividing the contained water weight by the weight of each sample before being heated, and the vertical axis represents the sensitivity. As shown in FIG. 23, the sensitivity decreases significantly when the water content exceeds 8 wt %. Therefore, it can be seen that it is possible to obtain a porous silica material suitable for realizing an optical microphone having a high sensitivity by controlling the water content of the porous silica material to be 8 wt %. In this experiment example, the lower limit for the water content was 0.79 wt %.

FIG. 8 shows the relationship between silica particles of various particle diameters whose density is less than 220 kg/m$^3$ and whose water content is 8 wt % or less and the sound speed. Table 3 below shows the physical properties of the samples. In Table 3, it was estimated that the water content of each sample denoted as "●" was about 0.79 wt %. This is because the water content was adjusted under the same conditions as the sample denoted as "□" (S1), specifically, by a hydrophobization process. For the particle diameter of each sample denoted as "x", the water content was adjusted under the same conditions as the sample denoted as "∆" (S4), i.e., storing it in a thermostat oven at 40° C. and a humidity of 80% for 24 hours. Therefore, it was estimated that the water content of each sample denoted as "x" is about 10.11 wt %, which is the same as Sample S4. It was estimated that the particle diameters of the samples denoted as "∆" and "○" were about 11.8 nm as described above with reference to Table 2. By extrapolating the results shown in FIG. 8 as described above, the relationship between the particle diameter r to the power of −1.5 and the sound speed for porous silica materials whose water content is 8 wt % or less shown in FIG. 9 was obtained.

TABLE 3

| Sample | Density (kg/m$^3$) | Particle diameter (nm) | Water content (wt %) | Sound speed (m/s) |
|---|---|---|---|---|
| ● | 57 | 8.2 | (≈0.79) | 62 |
| ● | 171 | 8.7 | (≈0.79) | 92 |
| ● | 142 | 9.8 | (≈0.79) | 64 |
| ● | 130 | 10.0 | (≈0.79) | 62 |
| ● | 153 | 10.1 | (≈0.79) | 66 |
| ● | 151 | 10.2 | (≈0.79) | 68 |
| ● | 144 | 10.7 | (≈0.79) | 67 |
| ● | 142 | 10.7 | (≈0.79) | 68 |
| ● | 159 | 11.1 | (≈0.79) | 67 |
| ● | 158 | 11.1 | (≈0.79) | 73 |
| ● | 159 | 11.1 | (≈0.79) | 68 |
| ● | 158 | 11.4 | (≈0.79) | 73 |
| ● | 142 | 11.4 | (≈0.79) | 66 |
| ● | 157 | 11.5 | (≈0.79) | 66 |
| □ | 111 | 11.8 | 0.79 | 50 |
| ● | 85 | 11.8 | (≈0.79) | 45 |
| ● | 78 | 11.9 | (≈0.79) | 46 |
| ● | 119 | 12.0 | (≈0.79) | 52 |
| ● | 113 | 12.4 | (≈0.79) | 52 |
| ● | 118 | 12.7 | (≈0.79) | 50 |
| ● | 111 | 13.2 | (≈0.79) | 49 |
| ● | 104 | 14.1 | (≈0.79) | 37 |
| ∆ | 102 | (≈11.8) | 10.11 | 83 |
| x | 275 | 8.7 | (≈10.11) | 133 |
| x | 218 | 9.4 | (≈10.11) | 104 |
| ○ | 104 | (≈11.8) | 12.22 | 275 |

From the experimental results above, particularly the results shown in FIGS. 7, 8 and 9, it was confirmed that it is possible to realize a porous silica material with a reduced sound speed and a low modulus of elasticity if the density is less than 220 kg/m$^3$, the particle diameter of the silica particles is 3.5 nm or more, and the water content is 8 wt % or less. As described above, the density of the porous silica material can be adjusted by adjusting the ratio between ethanol and tetramethoxysilane. The particle diameter of the silica particles can be adjusted by varying the gelation time. The water content of a porous silica material can be adjusted by a hydrophobization process on the porous silica material and/or by storing the porous silica material in a predetermined humidity atmosphere.

It was confirmed that each porous silica material produced by the method shown in the experiment example had a structure in which a plurality of silica particles are connected to one another three-dimensionally. It was confirmed that it is estimated that each porous silica material produced has the minute structure described above with reference to FIGS. 4, 5 and 6.

Second Embodiment

An embodiment of an optical microphone according to the present invention will be described.

Figure 24:
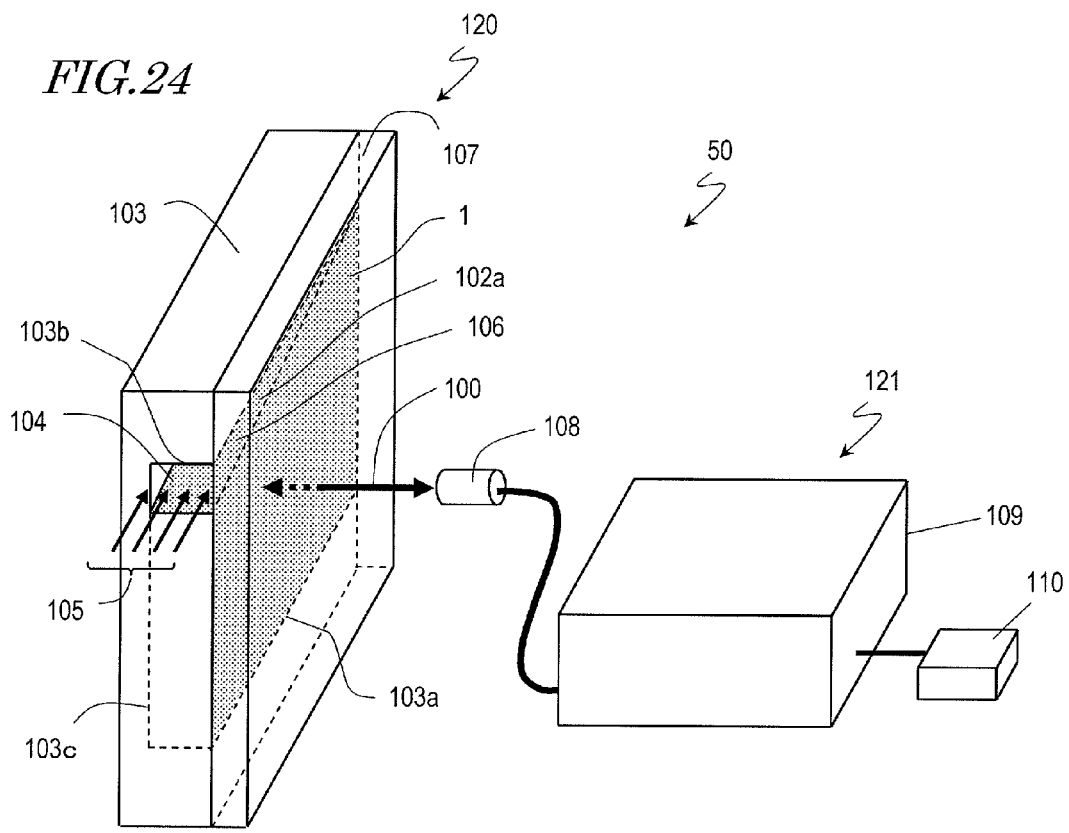
FIG. 24 is a configuration diagram showing one embodiment of an optical microphone according to the present invention.
Figure 25:
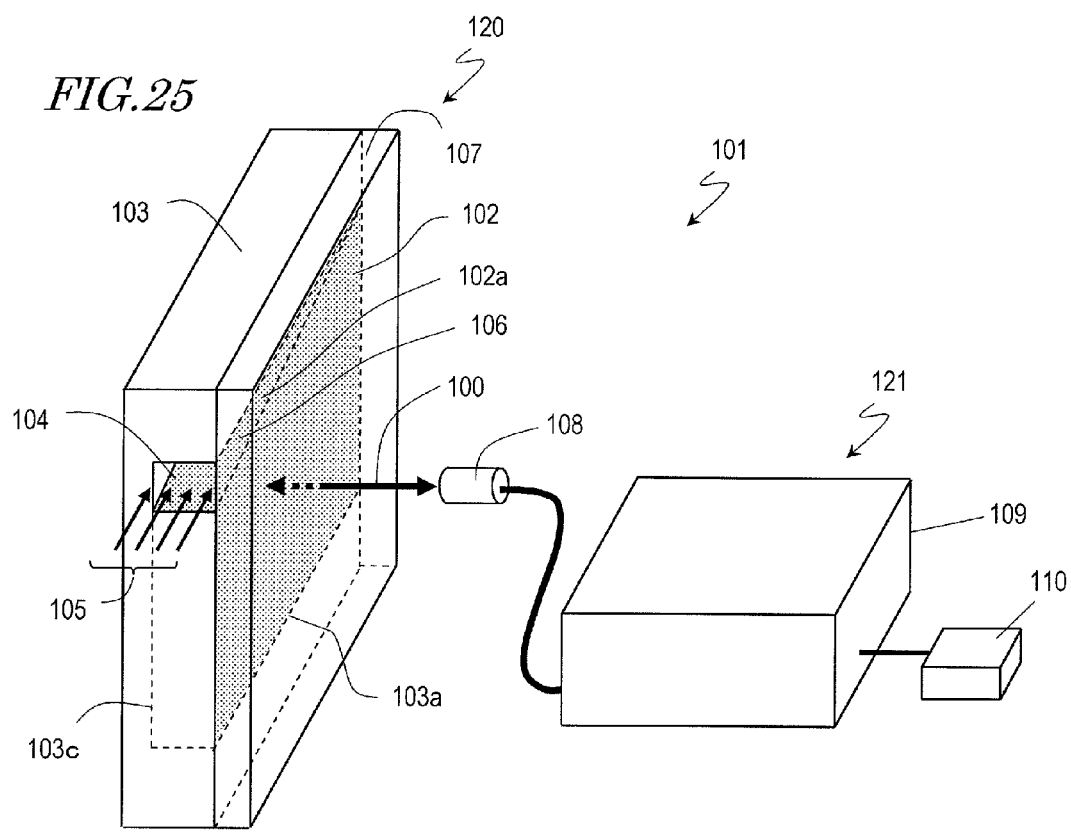
FIG. 25 is a diagram showing a configuration of a conventional optical microphone.

FIG. 24 is a schematic diagram showing a configuration of the embodiment of the optical microphone according to the present invention. An optical microphone 50 shown in FIG. 24 includes a reception section 120, a detection section 121, and a conversion section 110.

The reception section 120 receives a sound wave propagating through the space around the reception section 120, and converts the sound wave to variations in the optical properties. For this, a reception section 120 includes a base 103 having a depressed portion 103a, and a transparent support plate 107 supported so as to cover the opening of the depressed portion 103a. The acousto-optic propagation medium portion 102 made of the porous silica material 1 of the first embodiment is arranged in the space formed by the depressed portion 103a of a base 103 and the transparent support plate 107. Also, the depressed portion 103a includes an acoustic waveguide 106, one surface of which is defined by a top surface 102a of the acousto-optic propagation medium portion 102. The base 103 includes an opening 104 for allowing the sound wave to enter the acoustic waveguide 106.

The detection section 121 detects, using light, the variations in the optical properties which have occurred in the reception section 120. Specifically, light having such a wavelength that it will pass through the porous silica material 1 is output, and the light is allowed to pass through the acousto-optic propagation medium portion 102, with the sound wave propagating therethrough, so as to then detect light which has been modulated by the sound wave. The detection section 121 is a laser Doppler vibrometer (abbreviated as "LDV"), for example, and includes a head 108 and a calculation section 109.

A sound wave having propagated through the air propagates from the opening 104 into the acoustic waveguide 106 along a sound wave propagation direction 105. As the sound wave propagates through the acoustic waveguide 106, the sound wave enters the porous silica material of the acousto-optic propagation medium portion 102 through the top surface 102a of the acousto-optic propagation medium portion 102, and propagates through the acousto-optic propagation medium portion 102.

A laser beam 100 output from the head 108 toward the acousto-optic propagation medium portion 102 passes through the transparent support plate 107 and the acousto-optic propagation medium portion 102 to be reflected at a bottom surface 103c of the depressed portion 103a of the base 103. The reflected laser beam 100 passes again through the acousto-optic propagation medium portion 102 and exits from the acousto-optic propagation medium portion 102 to be received by the head 108. When a laser beam 100 passes through the acousto-optic propagation medium portion 102, the density and the refractive index of the porous silica material 1 of the acousto-optic propagation medium portion 102 vary due to the propagation of the sound wave therethrough, and the laser beam 100 is modulated by these variations.

The laser beam 100 received by the head 108 is converted to an electric signal and is then output to the calculation section 109. The calculation section 109 processes the electric signal to output, to a conversion section 110, a modulated component contained in the laser beam 100 as a detection signal. The conversion section 110 converts the detection signal to a sound pressure to output a received signal. The conversion in the conversion section 110 can be performed by, for example, the method described above in the background art section with reference to Expressions (1) to (5).

With the optical microphone of the present embodiment, since the porous silica material of the first embodiment is included as the acousto-optic propagation medium portion, the sound speed and the density of the acousto-optic propagation medium portion are low. Therefore, the change in the sound pressure occurring when the sound wave propagates through the acousto-optic propagation medium portion increases, and the amplitude of the modulated component of light detected by the detection section also increases. Thus, it is possible to detect the sound wave with a high sensitivity.

While a laser Doppler vibrometer is used as the detection section 121 in the present embodiment, a modulated component contained in light may be detected by using other detection devices, e.g., a laser interferometer, or the like, for detecting optical variations occurring in the acousto-optic propagation medium portion as it passes through the acousto-optic propagation medium portion. The structure of the reception section is not limited to the structure shown in FIG. 24.

Since the porous silica material described in the first embodiment is a solid that has a lower sound speed than the air, it can suitably be used as an acoustic propagation medium of an acoustic device. For example, it can suitably be used as an acoustic matching layer of an acoustic device using an ultrasonic wave.

The porous silica material disclosed in the present application is suitably used as an acoustic propagation medium of various acoustic devices and acousto-optic devices. Particularly, it is useful as an acousto-optic propagation medium of an optical microphone, or the like.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A porous silica material in which a plurality of silica particles are connected to one another three-dimensionally, wherein:
   a density of the porous silica material is less than 220 kg/m$^3$;
   a particle diameter of the silica particles is 3.5 nm or more; and
   a water content of the porous silica material is 8 wt % or less; and wherein
   a plurality of pores are provided between the plurality of silica particles, and the pores include a plurality of cavity portions and constriction portions located between the plurality of cavity portions; and
   an inner diameter of the constriction portion is smaller than an inner diameter of the cavity portion and is smaller than a mean free path of an air.

2. The porous silica material according to claim 1, wherein the particle diameter the plurality of silica particles is 3.5 nm or more and 20 nm or less.

3. The porous silica material according to claim 2, wherein the particle diameter of the plurality of silica particles is 8 nm or more and 20 nm or less.

4. The porous silica material according to claim 1, wherein the plurality of silica particles do not form secondary particles but form a skeleton of the porous silica material.

5. The porous silica material according to claim 1, wherein the density is 57 kg/m$^3$ or more and less than 220 kg/m$^3$.

6. The porous silica material according to claim 5, wherein the water content is 0.79 wt % or more and 8 wt % or less.

7. An optical microphone comprising:
   a reception section including acousto-optic propagation medium portion formed by a porous silica material in which a plurality of silica particles are connected to one another three-dimensionally, wherein:
      a density of the porous silica material is less than 220 kg/m$^3$;
      a particle diameter of the silica particles is 3.5 nm or more; and
      a water content of the porous silica material is 8 wt % or less,
   wherein a sound wave enters the reception section from a space around the reception section and propagates through the acousto-optic propagation medium portion;
   a detection section for outputting light of a wavelength that passes through the porous silica material, wherein the light passes through the acousto-optic propagation medium portion through which the sound wave is being propagated so as to detect the light which has been modulated by the sound wave, thereby outputting a detection signal; and
   a conversion section for converting the detection signal to a sound pressure to output a received signal.

8. The optical microphone according to claim 7, wherein the detection section is a laser Doppler vibrometer.

9. The optical microphone according to claim 7, wherein the porous silica material includes a plurality of pores provided between the plurality of silica particles, and the pores include a plurality of cavity portions and constriction portions located between the plurality of cavity portions; and
   an inner diameter of the constriction portion is smaller than an inner diameter of the cavity portion and is smaller than a mean free path of an air.

* * * * *